Sept. 8, 1970 F. BROUWER ET AL 3,527,882

COMBINATION OF FACSIMILE TRANSMITTER AND RECEIVER
OPERABLE IN A FEED THROUGH MANNER IN BOTH MODES

Filed Feb. 2, 1967 11 Sheets-Sheet 1

INVENTORS
Frans Brouwer.
Frank L. Sobchak.

By William J. Newman
Attorney

Sept. 8, 1970 F. BROUWER ET AL 3,527,882

COMBINATION OF FACSIMILE TRANSMITTER AND RECEIVER
OPERABLE IN A FEED THROUGH MANNER IN BOTH MODES

Filed Feb. 2, 1967 11 Sheets-Sheet 2

INVENTORS

Frans Brouwer.
Frank L. Sobchak

By William J. Norman

Attorney

INVENTORS.
Frans Brouwer
Frank L. Sobchak

By William J. Newman
Attorney

COMBINATION OF FACSIMILE TRANSMITTER AND RECEIVER OPERABLE IN A FEED THROUGH MANNER IN BOTH MODES

Filed Feb. 2, 1967

INVENTORS

Frans Brouwer.
Frank L. Sobchak

By William J. Newman

Attorney

INVENTORS
FRANS BROUWER
FRANK L. SOBCHAK

By William J. Hevron
Attorney

INVENTORS
FRANS BROUWER
FRANK L. SOBCHAK

By William J. [signature]
Attorney

INVENTORS
FRANS BROUWER
FRANK L. SOBCHAK

By William J. Newman
Attorney

INVENTORS
FRANS BROUWER
FRANK L. SOBCHAK

By William J. Newman
Attorney

INVENTORS

FRANS BROUWER
FRANK L. SOBCHAK

By William J. Newman
Attorney

INVENTORS
FRANS BROUWER
FRANK L. SOBCHAK

By [signature]
Attorney

INVENTORS
FRANS BROUWER
FRANK L. SOBCHAK

By William J. Newman
Attorney

United States Patent Office 3,527,882
Patented Sept. 8, 1970

3,527,882

COMBINATION OF FACSIMILE TRANSMITTER AND RECEIVER OPERABLE IN A FEED THROUGH MANNER IN BOTH MODES

Frans Brouwer, Glencoe, and Frank L. Sobchak, Chicago, Ill., assignors to Stewart-Warner Corporation, Chicago, Ill., a corporation of Virginia Filed Feb. 2, 1967, Ser. No. 613,545
Int. Cl. H04n *1/14, 1/22*
U.S. Cl. 178—6.6 42 Claims

ABSTRACT OF THE DISCLOSURE

A facsimile device which serves as both a transmitter and a recorder operable in an automatic feed through manner in both modes. The device comprises combined optical scanner and printer contact assemblies mounted on a timing belt assembly which is adapted to drive the optical scanner in a linear direction across a copy document fed therepast by a copy feed roller and to drive the printer contact in a linear direction across recording paper fed therepast by separate paper drive means. By simple selection means for operating the device in the desired mode, the optical scanner scans the desired copy as it passes therethrough to transmit facsimile signals to a remote location or, in the alternative, the printer contact means marks the recording paper as it passes therethrough in accordance with facsimile signals received from a remote location. The copy document and recording paper drive means are particularly arranged with respect to the optical and printer scanning means so that the copy document may be fed into the front of the device and a recorded document will emanate from the device in a manner such that it may be viewed as it comes out of the device.

The present invention relates generally to the field of wire transmission of graphic data and more particularly to facsimile scanner and recorder apparatus for use therein.

In a typical optical facsimile system, copy material is introduced into the copy feed roller of a transmitter. The copy material may consist of typewritten or printed text, line diagrams or photographs, or any other graphic material; and illumination thereof is provided by a stationary light source extending horizontally across the copy material. Elemental areas of the copy material, defined by diaphragm aperture means of the optical system, are successively scanned, horizontal scanning being attained by movement of the diaphragm aperture means horizontally across the copy material, and vertical scanning being accomplished by the forward motion of the copy material through the transmitter on the copy feed roller. Images from the scanned material, in various shades from black to white, are converted by the optical system into electric signals. These signals are superimposed on a carrier signal, amplified and sent to a receiver. At the receiver, electrical signals from the transmitter are converted to printing current and passed through associated printer contact means and a linear printer bar. The printer contact means is moved lengthwise of the printer bar, while moist electrolytic recording paper is drawn by drive roller means between the printer contact means and the printer bar transversely of the latter. Metal from the printer bar is deposited on the recording paper and reacts with chemicals therein to produce, in various shades from black to white, an image of the transmitted copy. The electrolytic printing process is completed and the recording paper dried by a heater bar located intermediate of the printer bar and the drive roller means. To align the printing mechanism of the receiver with the scanning mechanism of the transmitter, suitable phasing signals are provided by the transmitter. Heretofore, facsimile scanners or transmitters and facsimile recorders or receivers have been constructed as separate individual units. Therefore, every station intended for both transmitting and receiving data has been required to maintain at least two facsimile units—a transmitter and a receiver.

It is a primary object of the present invention to provide a combined facsimile transmitter and receiver—a facsimile transceiver—whereby economies of manufacture may be attained and space requirements minimized. The transceiver basically comprises a copy feed roller, optical scanning means, printer contact means, a printer bar assembly for cooperation with the printer contact means, and drive roller means for moving recording paper between the printer contact means and the printer bar assembly.

It is another object of the present invention to provide an optical scanner assembly for a facsimile device wherein a plurality of optical scanners are moved in a continuous closed path successively across copy material to be scanned. In general, the scanner assembly comprises drive and idler pulley assemblies, a timing belt assembly trained about the pulley assemblies, and optical scanner units, each including an optical scanner, mounted on the timing belt assembly for movement therewith.

It is another object of the present invention to provide an optical scanner assembly wherein the effective driven circumference of the timing belt assembly is a whole number multiple of the effective drive circumference of the drive pulley assembly so that synchronization of the scanner assembly may be attained by a synchronizer disc secured to the drive pulley assembly for direct rotation therewith.

It is another object of the present invention to provide an optical scanner assembly wherein guide means are associated with the timing belt assembly for maintaining the latter and the optical scanner units in a straight scanning path during travel intermediate of the drive and idler pulley assemblies.

It is another object of the present invention to provide an optical scanner assembly wherein light source means is carried by each optical scanner unit for improved illumination of copy material to be scanned.

It is another object of the present invention to provide an optical scanner wherein the diaphragm means thereof may be adjusted for varying the position of the aperture therein relative to the centerline of the scanner so that the latter may receive the projected image of any one of a plurality of object areas at different positions relative to the centerline.

It is a further object of the present invention to provide an optical scanner assembly wherein means are provided for selectively locking the drive pulley assembly against rotations so that the optical scanner units may be individually indexed at a common location and the diaphragm means of each of the optical scanners adjusted for accurately aligning the optical scanners in corresponding horizontal and vertical planes.

It is another object of the present invention to provide a novel form of timing belt assembly comprised of a pair of spaced apart endless flexible tapes of narrow width and a plurality of pin members extending between and secured at their end portions to the tapes. In this arrangement, each set of corresponding end portions of the pin members are fastened to the adjacent tape in a common plane whereby to eliminate the effects of camber along the lengths of the tapes.

It is a further object of the present invention to provide an optical scanner assembly wherein the drive pulley assembly includes tooth recesses that sequentially receive the pin members of the timing belt assembly for establishing a positive drive therebetween, and wherein the drive and idler pulley assemblies includes shoulders engageable with the ends of the pin members for maintaining the pin members in vertical alignment and eliminating drift of the belt assembly.

It is a still further object of the present invention to provide an optical scanner assembly wherein each optical scanner unit is mounted on two adjacent pin members of the timing belt assembly in such manner that the unit is positively located axially along the leading pin member for maintaining the unit in vertical alignment during movement with the timing belt assembly, and is loosely located on the trailing pin member to accommodate relative movement between the unit and the timing belt assembly as they pass around the drive and idler pulley assemblies.

It is another object of the present invention to provide an optical scanner assembly wherein printer contact means, adapted for cooperation with a printer bar assembly, is combined with each of the optical scanner units. This arrangement promotes compactness in a transceiver because movement of the optical scanners as required in the transmission mode and movement of the printer contact means as required in the receiving mode are effected by a single drive system.

It is a further object of the present invention to provide novel electrical transmission means for accomodating electrical interconnection of the several combined optical scanner and printer contact units of the optical scanner assembly with other electrical components of a transceiver. Such electrical transmission means comprises a rotor assembly, including a preamplifier, which is rotatable in synchronism with the timing belt assembly centrally thereof, flexible cable means interconnecting the optical scanner and printer contact units with the rotor assembly, and a commutator rotatable with the rotor assembly and arranged for cooperation with stationary contact brushes.

As a feature of the present invention, the framework of the facsimile transceiver is arranged with at least one side frame opening through which the optical scanner assembly may be moved endwise to accommodate installation and removal of same.

It is an additional object of the present invention to provide a facsimile transceiver wherein the copy feed roller is adapted to draw copy material onto its top side and discharge the same on its underside, and wherein the drive roller means draws recording paper between the printer contact means and the printer bar assembly in the same direction as copy material is adapted to be drawn onto the copy feed roller, so that reproduced data is oriented in the same manner as the original scanned data.

It is another object of the present invention to provide a facsimile transceiver wherein the printer bar assembly is adapted to be moved into operative relation with the printer contact means in the receiving mode, but is biased away from operative relation with the printer contact means in the transmission mode to permit transmission of data without concurrent print-out of such data in the same machine.

It is a further object of the present invention to provide a facsimile machine wherein the drive roller means for the recording paper is adapted to be driven at a normal speed while data is being reproduced and at a higher speed during initial startup in the receiving mode for rapidly clearing the print-out area of dry paper.

It is a further object of the present invention to provide a facsimile machine wherein the distance between the print-out area and the point of issuance of paper with reproduced data is minimized in order to reduce the time between print-out and presentation of reproduced data for viewing. This object is accomplished by providing a combined drive and heat roller assembly for the recording paper and eliminating the conventional separate heater bar.

Now in order to acquaint those skilled in the art with the manner of constructing and using facsimile devices in accordance with the principles of the present invention, there will be described in connection with the accompanying drawings a preferred embodiment of the invention.

Figures 24, 25, 26:
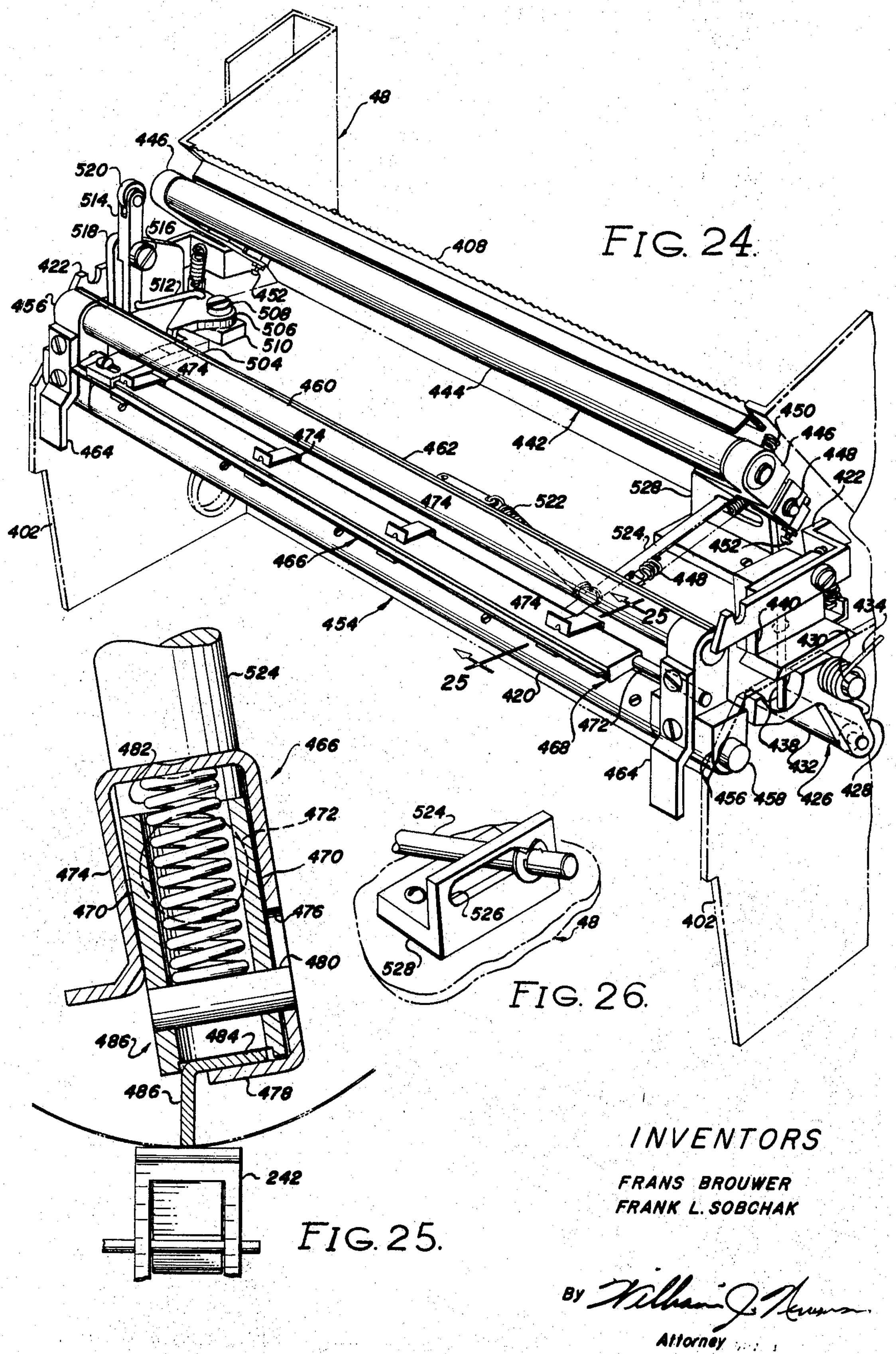
FIG. 24 is an enlarged perspective view looking toward the rear of the print-out mechanism of the transceiver of FIGS. 1–4, with the top door assembly that supports the print-out mechanism being shown in open position.

FIG. 25 is a further enlarged sectional view, taken substantially along the line 25—25 in FIG. 24, looking in the direction indicated by the arrows, and shows the relationship between the printer bar assembly and the printer contact means of the scanner assembly when the top door assembly is in closed position and the transceiver is in the receiving mode of operation; and FIG. 26 is a slightly enlarged perspective view of the printer bar guide bracket, and a portion of the associated guide rod, incorporated in the print-out mechanism of FIG. 24.

Referring now to FIGS. 1–4, there is indicated generally by the reference numeral 30, a facsimile transceiver incorporating the principles of the present invention. The facsimile transceiver 30 includes a framework comprised of a generally rectangular horizontal base member 32 on which a panel rack assembly 34 is mounted at the rear end thereof. The panel rack assembly 34 serves to support a plurality of circuit boards 36 and other electrical and electronic components of the transmitter and receiver circuits of the facsimile transceiver 30. Because the present application is directed to the mechanical features of the transceiver 30, a description of the electrical and electronic circuitry will not be include herein. However, circuits well known in the facsimile art may be used for the transmitting and receiving modes of operation and the compatibility of the arrangements for optical scanning as well as recording is an asset of this design. Secured to the base member 32 adjacent the forward end thereof is a frame assembly 38, comprised of a pair of upright generally inverted L-shaped side frame members 40 that define side frame openings for a purpose to be described hereinafter. The upper forward portions of the side frame members 40 are interconnected by a transverse trough-like shroud 42, while the inner rearward ends of the horizontal leg portions of the side frame members 40 are interconnected by a cross bar 44. Pivotally mounted to the shroud 42, as at 46, is a top door assembly 48 which, together with the side frame members 40, supports the print-out mechanism operable in the receiving mode of the transceiver as will be described hereinafter. The panel rack assembly 34 and the side frame members 40 are suitably enclosed by a cover assembly 50 (FIG. 1) removably secured to the base member 32 in a conventional manner. The forward portion of the cover assembly 50 is cut back to accommodate the top door assembly 48 in closed position.

Operable in the transmission mode of the facsimile transceiver 30 are a copy feed mechanism indicated generally at 52 and a scanner assembly indicated generally at 54.

The copy feed mechanism 52 includes a transverse copy feed roller 56 having stub shaft ends that are rotatably journalled in the side frame members 40. One end of the copy feed roller 56 has connected thereto a drive motor unit 58 which is synchronized to the power line frequency, and the other end of the copy feed roller 56 has secured thereon a hand knob 60 which extends through a suitable opening in the side wall of the cover assembly 50. An over-riding clutch mechanism, which is associated with the drive motor unit 58, permits manual rotation of the hand knob 60 and the copy feed roller 56 to accommodate insertion or removal of copy independent of the drive motor unit 58. Conventional pressure rollers 62 and guide plates 64 serve to hold copy against the roller 56. The inner edges of the guide plates 64 are spaced apart to define a longitudinal scanning slot 65 for a purpose to be described presently. As will be appreciated, copy material is inserted on the top side of the copy feed roller 56 with the graphic data to be scanned facing upwardly. The roller 56 automatically feeds the copy material past the longitudinal scanning slot defined by the guide plates 64, and the copy material is discharged on the underside of the roller 56. To facilitate movement of copy toward and away from the roller 56, a copy feed tray 66 and a copy discharge tray 68 may be suitably mounted at the forward end of the transceiver 30.

The scanner assembly 54 extends parallel to the copy feed roller 56, and, as shown in FIGS. 5–8, includes frame means comprised of a main frame 70 and a yoke member 72, drive and idler pulley assemblies 74 and 76, a timing belt assembly 78 trained about the pulley assemblies 74 and 76, combined scanner and printer contact units 80 carried by the timing belt assembly 78, and associated synchronizing and electrical transmission means.

The main frame 70 of the scanner assembly 54 comprises horizontal upper and lower wall portions 82 and 84 with upper and lower end arm portions 86 and 88, vertical intermediate web portions 90 and 92, and depending support legs 94 and 96 which are adapted to be secured to the base member 32. The yoke member 72 comprises upper and lower arm portions 98 and 100 and an intermediate flange portion 102 secured to the main frame web portion 90. When the main frame 70 and the yoke member 72 are in assembled relation, the frame arms 86 and 88 and the yoke arms 98 and 100 extend in opposite directions with the respective upper and lower arms lying in common planes.

The drive pulley assembly 74 comprises a spool-like drive pulley having a central body portion 104 and upper and lower flange portions 106 and 108. The periphery of the flange portion 106 is formed with a plurality of circumferentially spaced tooth recesses 110, and the outboard side of the flange portion 106 is formed with a plurality of slots 112 that correspond in number and location to the tooth recesses 110. Guide blocks 114 are secured, as by screws 115, in the slots 112, and, at their outer ends, project radially across the tooth recesses 110 defining inner radial shoulders **115*a* in a common plane. The flange portion 108 has a guide ring 116 secured therein as by screws 117. The ring 116 presents an annular inner radial shoulder 115*b*, and the flange portion 106 and the ring 116 present cylindrical faces 117*a* and 117*b*, respectively. The drive pulley assembly 74 is secured, by set screws 118, to a vertical drive shaft 120. The upper and intermediate portions of the drive shaft 120 are, respectively, journalled in bearing assemblies 122 and 124 mounted in openings formed in the frame arms 86 and 88. The shaft 120 and the bearing assemblies 122 and 124 are held in assembled position by annular retainer members 126. To facilitate adjustment of the scanner assembly in a manner to be described hereinafter, a manually operated pin 128 is slidably mounted in the frame web 92 and is movable into and out of engagement with one of the tooth recesses 110 of the drive pulley 74**.

The idler pulley assembly 76 comprises a spool-like idler pulley having a central body portion 130 and upper and lower flange portions 132 and 134 with the outboard sides thereof being formed with annular recesses 136. Guide rings 138 are secured, as by screws 140, in the recesses 136, and project radially beyond the peripheries of the flange portions 132 and 134. The rings 138 define annular inner radial shoulders **135*a* and 135*b* and peripheral cylindrical faces 137*a* and 137*b* respectively. To maintain proper guidance of the timing belt assembly 78 as will be more fully described hereinafter, the inner radial shoulders 135*a* and 135*b* of the guide rings 138 lie in the same planes as the corresponding inner radial shoulders 115*a* and 115*b* of the drive pulley assembly 74. The idler pulley assembly 76 is secured, by set screws 142, to a vertical idler shaft 144 journalled at its ends in bearing assemblies 146 mounted in suitable openings formed in the yoke arms 98 and 100. The shaft 144 and the bearing assemblies 146 are held in assembled position by annular retainer members 148**.

Figures 7, 9, 10:
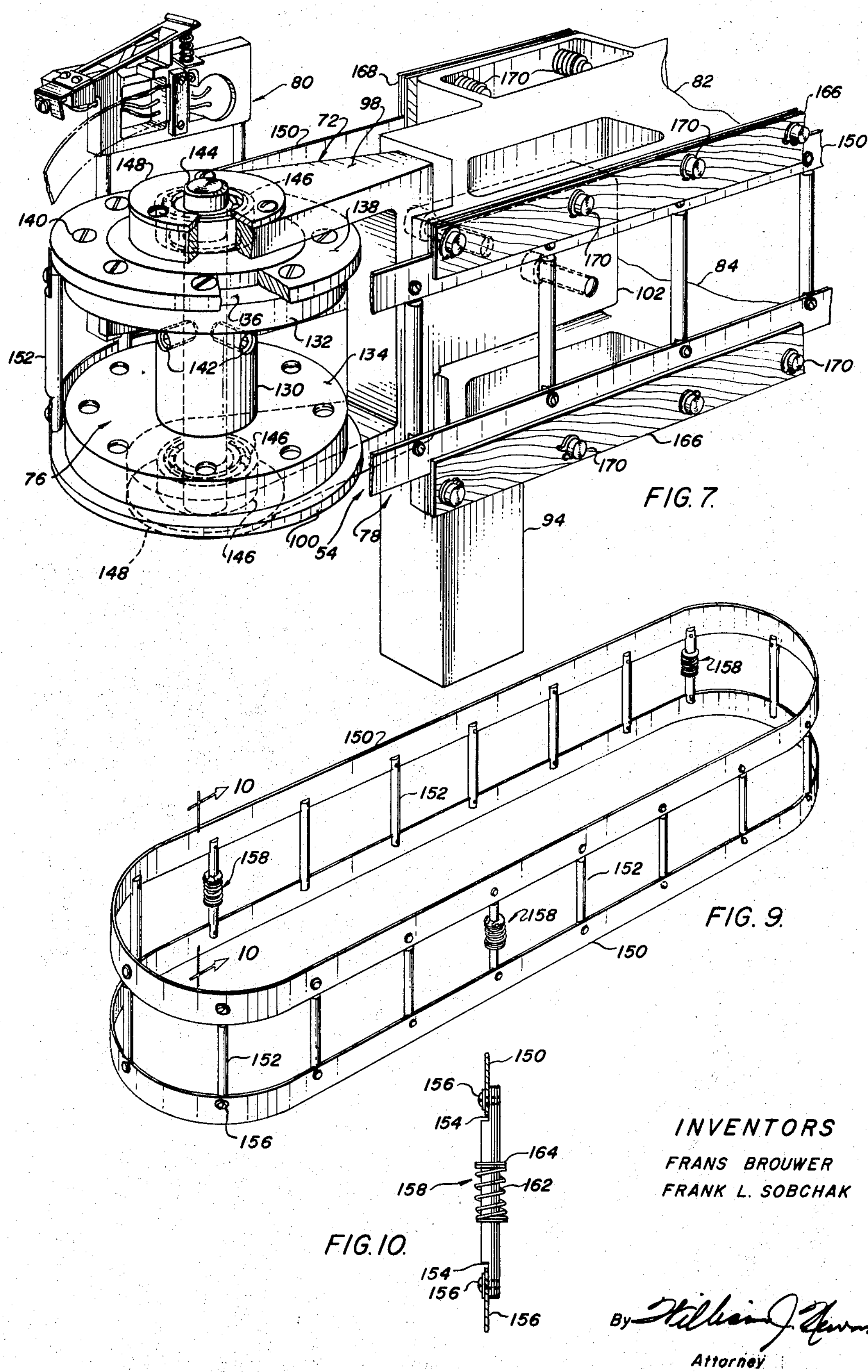
FIG. 7 is a perspective view, on an enlarged scale, of the left end portion of the scanner assembly of FIG. 5 looking toward the front thereof.
FIG. 9 is a perspective view of the timing belt assembly of the scanner assembly of FIG. 5.
FIG. 10 is an enlarged sectional view, taken substantially along the line 10—10 in FIG. 9, looking in the direction indicated by the arrows.

Trained about the drive and idler pulley assemblies 74 and 76, as previously noted, is the timing belt assembly 78. As best shown in FIGS. 9 and 10, the timing belt assembly 78 comprises a pair of spaced apart horizontal endless flexible steel tapes 150 of narrow width interconnected by a plurality of equi-distant spaced parallel pin members 152 of the same overall length. The opposed ends of the pin members 152 are formed with flats 154 which seat against the inner faces of the respective tapes 150 and are secured thereto as by screws 156. To provide a precise timing belt assembly, close tolerances are maintained with respect to the overall lengthwise dimension of the pin members 152, and the ends 153*a* and 153*b* of the pin members 152 are accurately fastened to the adjacent tape 150 so as to lie in common planes. In these circumstances, the pin members 152 eliminate the effects of camber along the lengths of the tapes 150 which together serve as tape means. Certain equi-distantly spaced pin members 152, numbering three in the specific embodiment of the invention disclosed, are provided with spring assemblies 158 for positioning the scanner and printer contact units 80 to be described hereinafter. Each spring assembly 158 comprises retaining ring and washer means 160 secured in a groove in the associated pin member 152, a compression coil spring 162 resting thereon, and a bearing washer 164 slidable along the pin member 152 at the upper end of the spring 162.

Figures 5, 6:
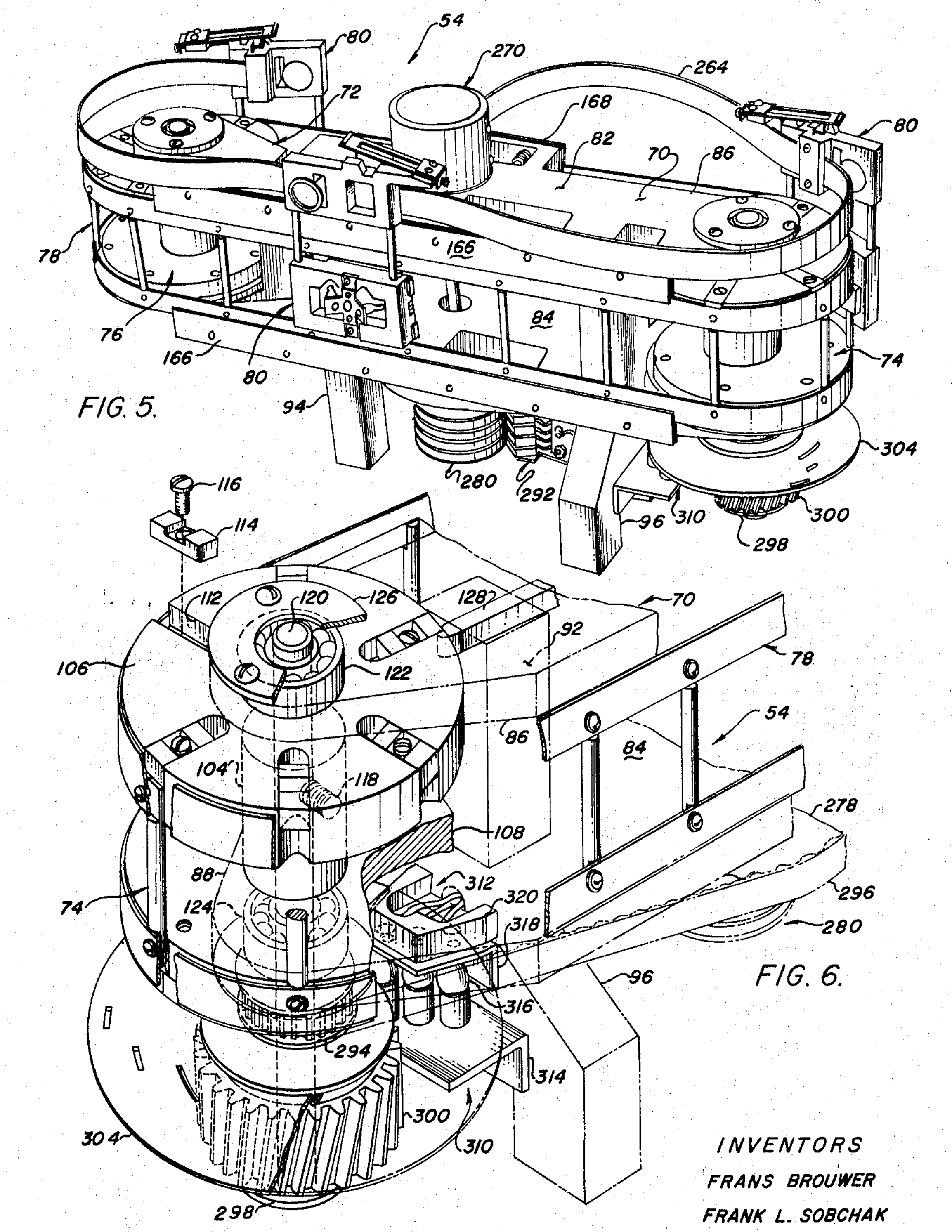
FIG. 5 is a perspective view looking toward the front of the scanner assembly of the facsimile transceiver of FIGS. 1–4.
FIG. 6 is a perspective view, on an enlarged scale, of the right end portion of the scanner assembly of FIG. 5 looking toward the rear thereof.

When the timing belt assembly 78 is mounted about the drive and idler pulley assemblies 74 and 76, as shown in FIGS. 5–8, the tapes 150 are engageable with the cylindrical faces 117*a* and *b*, 137*a* and *b* of the drive and idler pulley assemblies, respectively, and the end portions of the pin members 152, which serve as tooth elements, are receivable in the tooth recesses 110 of the drive assembly 74. Thus a positive driving connection is established between the drive pulley assembly 74 and the timing belt assembly 78. Also, the ends 153*a* and *b* of the pin members 152 are engageable with the inner radial shoulders 115*a* and *b*, 135*a* and *b* of the drive and idler pulley assemblies 64 and 76. By reason of this arrangement, the pin members 152 are maintained in vertical alignment, and drift of the belt assembly 78, which would otherwise result from the use of tapes 150 of narrow width, is eliminated. Additionally, as shown in FIGS. 5 and 7, pairs of tape guides, in the form of longitudinal strips 166 and 168, are provided on the opposite sides of the main frame 70 intermediate of the drive and idler pulley assemblies 74 and 76. The tape guides 166 and 168, which are carried and biased inwardly by spring loaded support members 170, overlie and engage portions of the outer edges of the tapes 150, and press the tapes flat against the adjacent guide faces or surfaces of the upper and lower wall portions 82 and 84.

Figure 11:
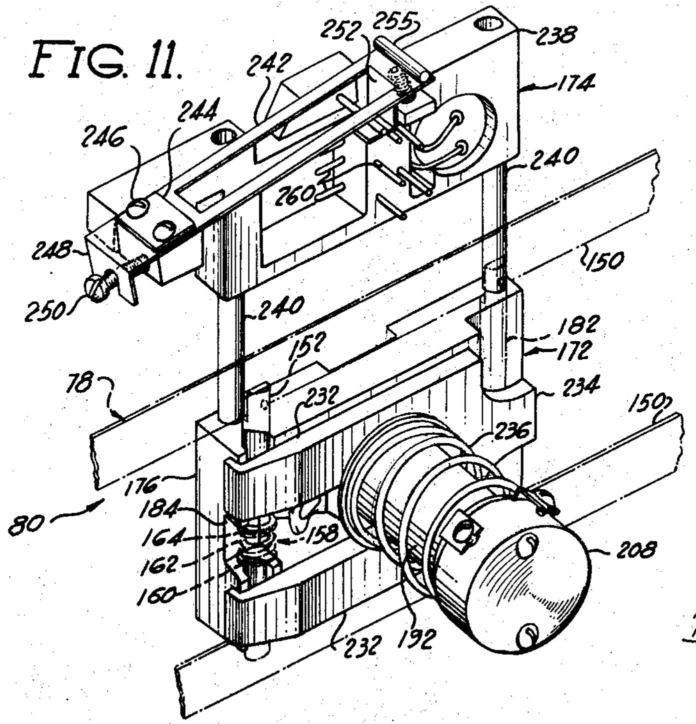
FIG. 11 is a perspective view, on an enlarged scale, of one of the optical scanner and printer contact units of the scanner assembly of FIG. 5.
Figures 12, 13:
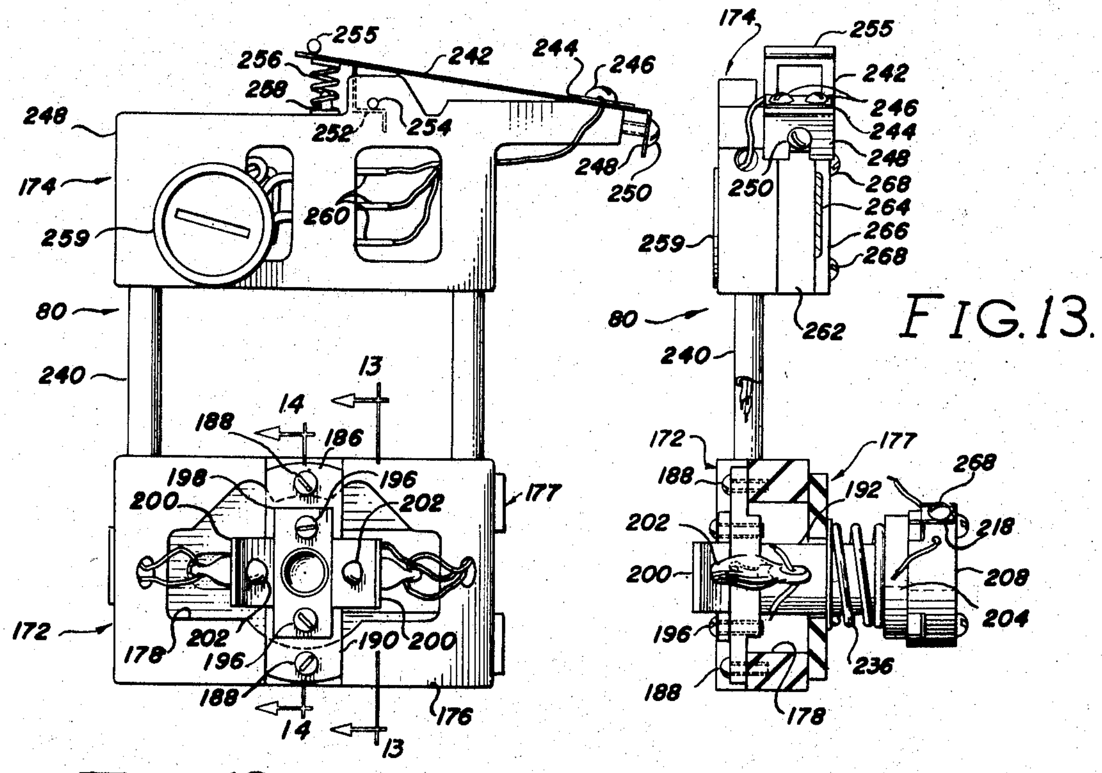
FIG. 12 is a front elevational view of the scanner and printer contact unit of FIG. 11.
FIG. 13 is a side elevational view, with certain portions being removed, of the scanner and printer contact unit of FIG. 12.

Supported by and moved with the timing belt assembly 78 are the combined scanner and printer contact units 80, three of which are incorporated in the specific embodiment of invention herein disclosed. Each scanner and printer contact unit 80, as shown in FIGS. 11–13, includes a lower optical scanner carrier assembly 172 and an upper carriage and contact assembly 174.

Figure 14:
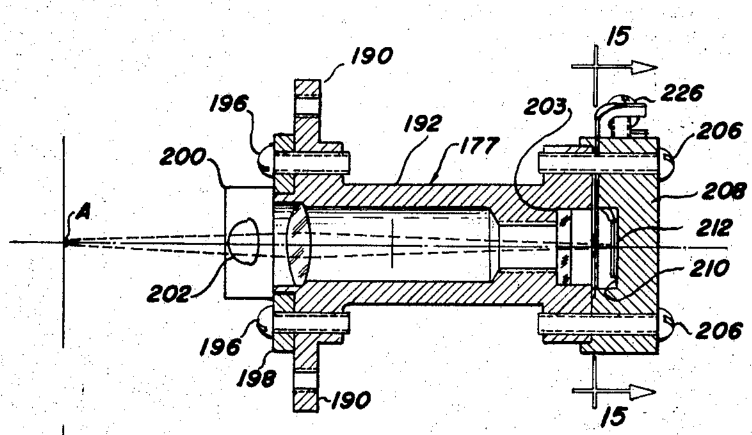
FIG. 14 is an enlarged sectional view of an optical scanner, taken substantially along the line 14—14 in FIG. 12, looking in the direction indicated by the arrows.

The scanner carriage assembly 172 comprises a scanner carriage 176 which carries an optical scanner 177. The carriage 176 has formed therein a central transverse irregular opening 178, a pair of rear vertical channels 180 and 182 arranged to receive two of the timing belt pin members 152, and a rear transverse recess 184 intersecting the channel 180 whereby to define vertically spaced positioning shoulders 185 for mounting purposes to be described. Secured in front slots 186 of the scanner carriage 176, as by screws 188, are the lateral flange portions 190 of a horizontal rearwardly extending elongated hollow lens holder 192 which comprises part of the optical scanner 177. Mounted in the forward end of the lens holder 192, as shown in FIGS. 12 and 14, is a double convex lens 194, and secured as by screws 196 to the front end of the lens holder 192 is a lamp holder 198 having side wing portions 200 bent forwardly at different oblique angles. The side wing portions 200 are formed with apertures through which the forward ends of lamp bulbs 202 project. The lamp bulbs 202, which serve as a scanning light source means, move with the optical scanner 177 for providing improved uniform illumination of object areas of copy material being scanned. Mounted in the rearward end of the lens holder 192 is a conventional filter glass 203.

Secured to the rear annular flange 204 of the lens holder 192, as by screws 206, is a photocell holder 208. The holder 208 is formed with a central cavity 210 in which a photocell 212 is mounted, and is also formed with perpendicular radial channels 214 and 216 (FIG. 15) in which generally rectangular diaphragm leaves 218 and 220 are adjacently positioned transversely of the lens holder 192 forwardly of the photocell 212. The diaphragm leaves 218 and 220, which constitute diaphragm means, are rectilinearly movable each in a path perpendicular to the other in their respective transverse planes, and are respectively provided with overlapping slots 222 and 224 which are arranged at an angle of 45 degrees relative to the paths of movement of the diaphragm leaves and perpendicular to each other. The slots 222 and 224 define a square aperture through which, as shown in FIG. 14, an image of an object area A (an elemental area of copy material) is projected to the photocell 212.

Figure 16:
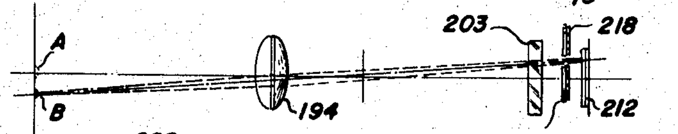
FIG. 16 is a diagrammatical view illustrating the effect of adjustment of the optical diaphragm means of the optical scanner of FIG. 14.
Figure 15:
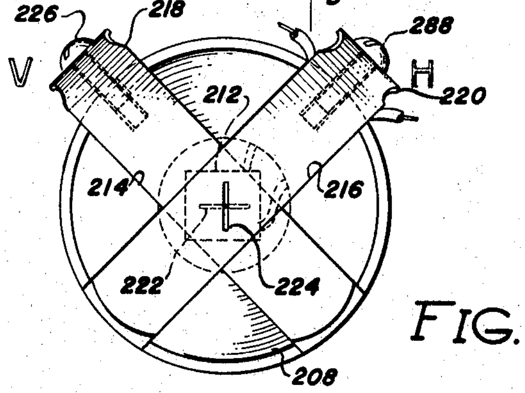
FIG. 15 is a front elevational view, on a further enlarged scale, of the optical diaphragm means of the optical scanner of FIG. 14, taken substantially along the plane 15—15 in FIG. 14, looking in the direction indicated by the arrows.

The upper ends of the diaphragm leaves 218 and 220, as shown in FIGS. 14 and 15, are formed with axial flanges through which are disposed adjustment screws 226 and 228. By threading the screws 226 and 228 inwardly or outwardly, the diaphragm leaves 218 and 220 may be adjusted rectilinearly for varying the relative positions of the slots 222 and 224 and hence the position of the square aperture relative to the horizontal centerline of the lens holder 192. Adjustment of the screw 226 effects movement of the square aperture in a vertical direction whereby, for example, the image of an object area B (FIG. 16), rather than of object area A, may be projected to the photocell 212. In a corresponding manner, adjustment of the screw 228 effects movement of the square aperture in a horizontal direction. The displacement from the centerline of the object area being scanned in relation to the offset position from the centerline of the square aperture is a function of the magnification of the lens 194. By reason of the described arrangement, the optical scanner 177 may be adjusted so that the photocell 212 will receive the projected image of any one of a plurality of object areas at different positions relative to the centerline of the lens holder 192.

Figure 17:
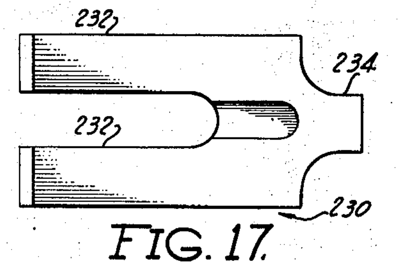
FIG. 17 is an elevational view of the latch plate for connecting the optical scanner and printer contact unit of FIG. 11 to the timing belt assembly.
Figure 18:
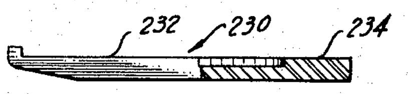
FIG. 18 is a median sectional view of the latch plate of FIG. 17.

In mounting each scanner and printer contact unit 80 on the timing belt assembly 78 as shown in FIG. 11, the vertical channel 180 of the scanner carriage 176 is disposed against one of the timing belt pin members 152 on which a spring assembly 158 is mounted, and the spring assembly 158 is compressed and moved into the adjacent transverse recess 184. The coil spring 162 acting against the upper retaining ring 164 presses against the lower shoulder of the recess 184 thereby urging the scanner carriage 176 downwardly until the upper shoulder 185 of the recess 184 engages the retaining ring 164. At the same time, the vertical channel 182 of the scanner carriage 176 is disposed in engagement with the next adjacent trailing timing belt pin member 152. Finally, a latch plate 230 (FIGS. 11, 17 and 18), having bifurcated arms 232 to accommodate the lens holder 192, is moved across the rear face of the scanner carriage 176.

The outer ends of the bifurcated arms 232 serve to latch the leading timing belt pin member 152 in the vertical channel 180, while the heel portion 234 of the latch plate 230 serves to latch the trailing timing belt pin member 152 in the vertical channel 182. The latch plate 230 is maintained in latching position by means of a coil spring 236 arranged concentrically about the intermediate body portion of the lens holder 192. The forward end of the spring 236 bears against the latch plate 230, while the rear end of the spring bears against the rear annular flange 204 of the lens holder 192. In this manner, the scanner and printer contact unit 80 is releasably secured to the timing belt assembly 78. Moreover, the unit 80 is positively located axially along the leading timing belt pin member 152 for maintaining the unit in vertical alignment during movement with the timing belt assembly, and is loosely located on the trailing timing belt pin member 152 to accommodate relative movement between the unit and the timing belt assembly as they pass around the drive and idler pulley assemblies 74 and 76.

When the units 80 are in mounted position, the forward end of each optical scanner 177 faces outwardly of the timing belt assembly 78 and the rearward end thereof faces inwardly of the belt assembly. Because the optical scanners 177 are adjustable, they can be aligned while the units 80 are mounted on the timing belt assembly 78. To accurately align the several optical scanners 177 in corresponding horizontal and vertical planes, the scanner and printer units 80 are successively and individually indexed at a common location by selectively locking the drive pulley assembly 74 against rotation with the slidable pin 128. While each optical scanner 177 is in turn positioned at the common indexed location, the diaphragm leaves 218 and 220 thereof are adjusted by appropriately turning the screws 226 and 228 until the diaphragm aperture is properly aligned with an external light source or a black dot illuminated by the lamp bulbs 202. Thereafter, in normal operation, the photocells 212 of all scanners 177 will scan along the same horizontal line at an accurate phase relationship with respect to the scanning drive means.

The upper carriage and contact assembly 174, as shown in FIGS. 11–13, comprises a carriage block 238 supported vertically above the scanner carriage assembly 172 by means of interconnecting vertical tubular post members 240. Printer contact means in the form of a printer contact strip 242 extends along the top side of the carriage block 238 and is secured to an inclined top surface thereof by means of a contact clamp spring 244 and screws 246. The end of the printer contact strip 242 adjacent the mounting screws 246 is formed with a depending arm portion 248 through which extends a screw 250 that is threaded into the adjacent wall portion of the carriage block 238. Adjacent the other end of the printer contact strip 242, there is provided a depending generally L-shaped leg portion 252 that is engageable with a lateral pin member 254 secured in the carriage block 238. The free end of the printer contact strip 242, which has provided thereon a printer contact element 255 movable in the general vertical plane of the centerline of the optical scanner 177, is normally biased upwardly by means of a coil spring 256 interposed between the underside of the contact strip 242 and a spring support member 258 secured on the top side of the carriage block 238. The printer contact element 255 is arranged to cooperate in the receiving mode with a printer bar assembly to be described hereinafter. Suitably mounted in the carriage block 238 are a potentiometer 259 for controlling the level of light of the lamp bulbs 202, and a plurality of horizontal L-shaped male connectors 260. The leg portions of the male connectors 260 that extend parallel to the carriage block 238 are connected by conductors to the lamp bulbs 202, the photocell 212, the printer contact strip 242 and the potentiometer 259. The leg portions of the male connectors 260 that extend rearwardly from the carriage block 238 project through a female connector base 262 and are connected individually to lengthwise conductors provided on a flexible cable or ribbon tape 264. The connections of the male connectors 260 with the ribbon tape 264 are enclosed by a cover plate 266, and the cover plate 266 and the female connector base 262 are secured to the carriage block 238 by means of screws 268.

Figure 8:
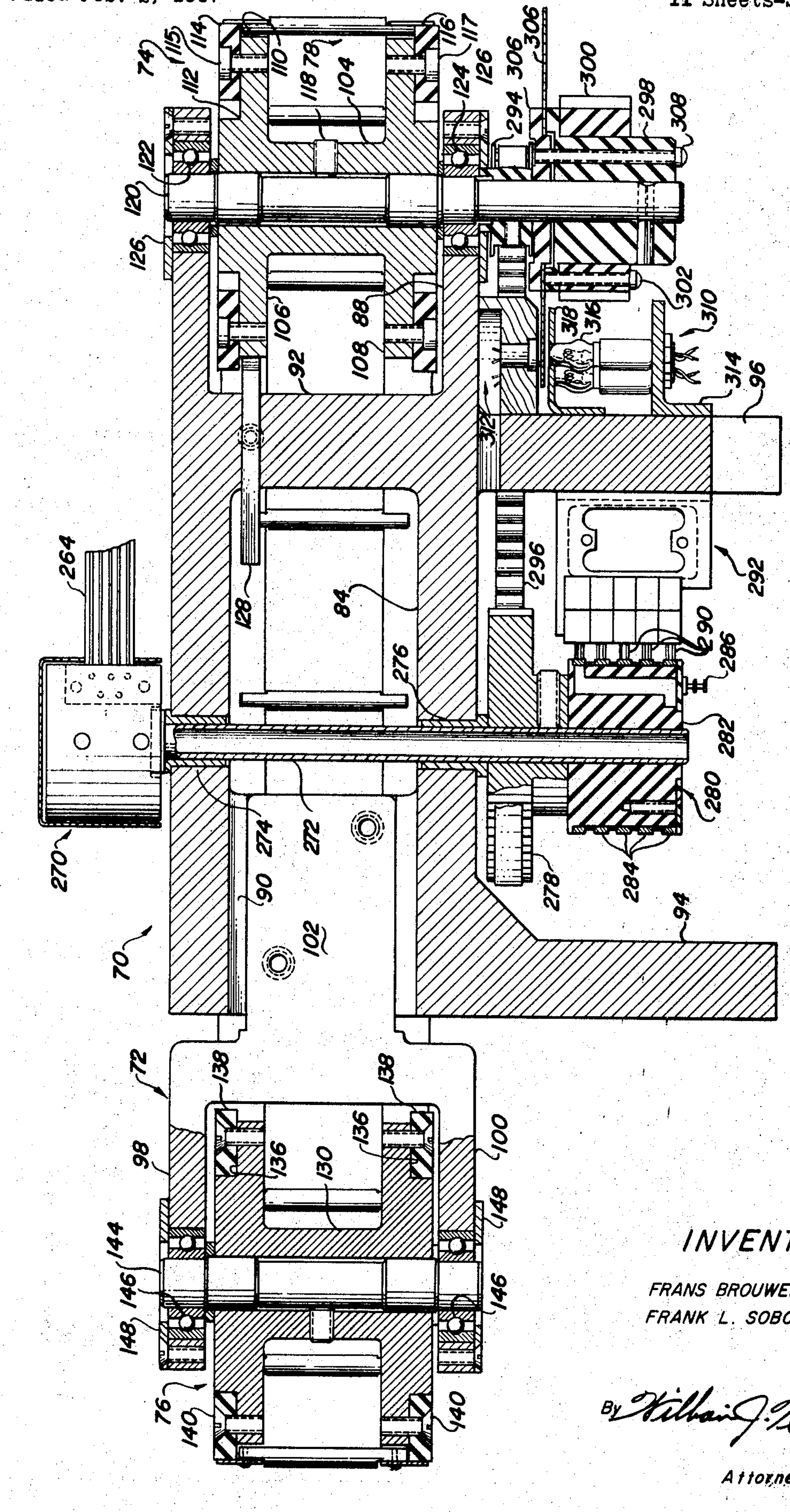
FIG. 8 is a longitudinal sectional view, on an enlarged scale, of the scanner assembly of FIG. 5.

As shown in FIG. 5, preferably a single ribbon tape 264 extends among and interconnects the three scanner and printer contact units 80, and at one terminal end is connected to a rotor assembly 270 comprised of a preamplifier unit located centrally of the main frame 70. However, if desired, separate ribbon tapes may be individually connected between each unit 80 and the rotor assembly 270. The rotor assembly 270, as shown in FIG. 8, is secured to the upper end of a tubular shaft 272 journalled in bearings 274 and 276 respectively mounted in the upper and lower wall portions 82 and 84 of the main frame 70. Secured to the tubular shaft 272 immediately below the bearing 276 is a toothed pulley 278 which is adapted to be driven in a manner presently to be described for effecting rotation of the tubular shaft 272 and the rotor assembly 270 during movement of the timing belt assembly 78. Also secured to the tubular shaft 272, at the lowermost end thereof, is a commutator assembly 280 which comprises a body portion 282, peripheral axially spaced commutator or slip rings 284, and a slip cover assembly 286 that supports a plurality of terminals 288. The rotor assembly 270 is connected to electrical conductors (not shown) which extend downwardly through the tubular shaft 272 and are suitably connected to the terminals 288 which, in turn, are interconnected with the respective commutator rings 284 by electrical conductors (not shown). The commutator rings 284 are engaged by stationary contact brushes 290 carried by a terminal block 292 secured to the depending support leg 96 of the main frame 70. The terminal block 292 is provided with suitable pin connectors (not shown) by means of which the electrical components of the scanner assembly 54, through the described electrical transmission means, are adapted to be connected to other electrical components of the transceiver 30.

The lower end of the scanner drive shaft 120 has secured thereon a toothed pulley 294. A toothed rubber belt 296 is trained about the pulleys 294 and 278 whereby to establish a driving connection therebetween. By reason of the relative diameters of the pulleys 278 and 294 and the arrangement of the belt 296, the tubular shaft 272 and the rotor and preamplifier assembly 270 are rotated in the same direction and at the same speed in r.p.m. as the timing belt assembly 78. Also secured to the scanner drive shaft 120 adjacent the lower end thereof is a gear adaptor 298 to which a gear ring 300 is secured as by bolts 302. The adaptor 298 supports at its upper end an annular synchronizer disc 304 having synchronizer slots 305 formed therethrough. The disc 304 is maintained in position for rotation with the adaptor 298 by means of a retainer ring 306 secured to the adaptor 298 by bolts 308. The synchronizer disc 304 rotates in a plane intermediate of a light source 310 and a solar cell assembly 312. The light source 310 comprises a mounting bracket 314 secured to the support leg 96 of the main frame 70, a plurality of lamp bulbs 316 supported on the bracket 314, and an alignment bracket 318 having apertures through which the upper ends of the lamp bulbs 316 project. The solar cell assembly 312 includes a plurality of solar cells (not shown) mounted in a holder 320 secured to the main frame 70 adjacent the support leg 96. The foregoing synchronizing means will be discussed further hereinafter.

In the foregoing construction, the scanner assembly 54 is movable endwise through either of the afore-noted side frame openings defined by the side frame members 40 (FIG. 4) to accommodate installation and removal thereof. When the scanner assembly 54 is in assembled position, the gear 300 associated with the drive pulley assembly 74 is adapted to be rotated by a worm gear 322 (FIGS. 3 and 4) driven by a synchronous motor 324 supported by brackets 325 on the base member 32. When the gear 300 is rotated, the drive pulley assembly 74 and the timing belt assembly 78 are correspondingly rotated, and the units 80 with the optical scanners 177 are accordingly moved in a continuous closed path a portion of which extends parallel to the copy feed roller 56. The spring biased tape guides 166 and 168 serve to maintain the timing belt assembly 78 and the units 80 in straight scanning and return paths during travel intermediate of the drive and idler pulley assemblies 74 and 76. The scanner and printer units 80 are equi-distantly spaced apart about the timing belt assembly 78, the distance between the units 80 determines the maximum length of a line of copy material that may be scanned (a scan length), and each scanner 177 scans the series of elemental areas in one line of copy material within the limits of the scan length. The described synchronizing means, comprised in part of the synchronizer disc 304, accommodates the transmission of phasing signals between two associated transceivers—one signal for each scan length—whereby the speed of recording is synchronized with the speed of scanning to obtain a true reproduction of the original copy material. To attain desired synchronization, and because the synchronizer disc 304 is driven directly with the drive pulley assembly 74, the effective driven circumference of the timing belt assembly 78 must be a whole number multiple of the effective drive circumference of the drive pulley assembly 74. In the specific embodiment of scanner assembly disclosed herein, one revolution of the drive pulley assembly 74 is equivalent to one scan length, the ratio of the critical circumferences is 3 to 1, and three scanner and printer units 80 are mounted on the timing belt assembly 78. When the drive assembly is rotated at 300 r.p.m., the timing belt assembly 78 is rotated at 100 r.p.m., and the scanning rate is 300 lines per minute. As copy material is drawn about the copy feed roller 56, it is scanned, line-by-line, an elemental area at a time. The images received by the photocells 212 of the optical scanners 177 are converted to electrical signals by suitable circuitry (not shown), and these signals are sent to another transceiver or other suitable facsimile recording device for reproduction of the original copy material.

In the receiving mode of the facsimile transceiver 30, electrical signals received from another transmitter are converted to printing current by suitable circuitry (not shown) and this current is used to produce an image of the transmitted copy on electrolytic recording paper. The print-out mechanism, operable in the receiving mode, includes the printer contact means carried by the scanner assembly 54, other components supported by the side frame members 40, and still other components supported in the top door assembly 48.

Figure 1:
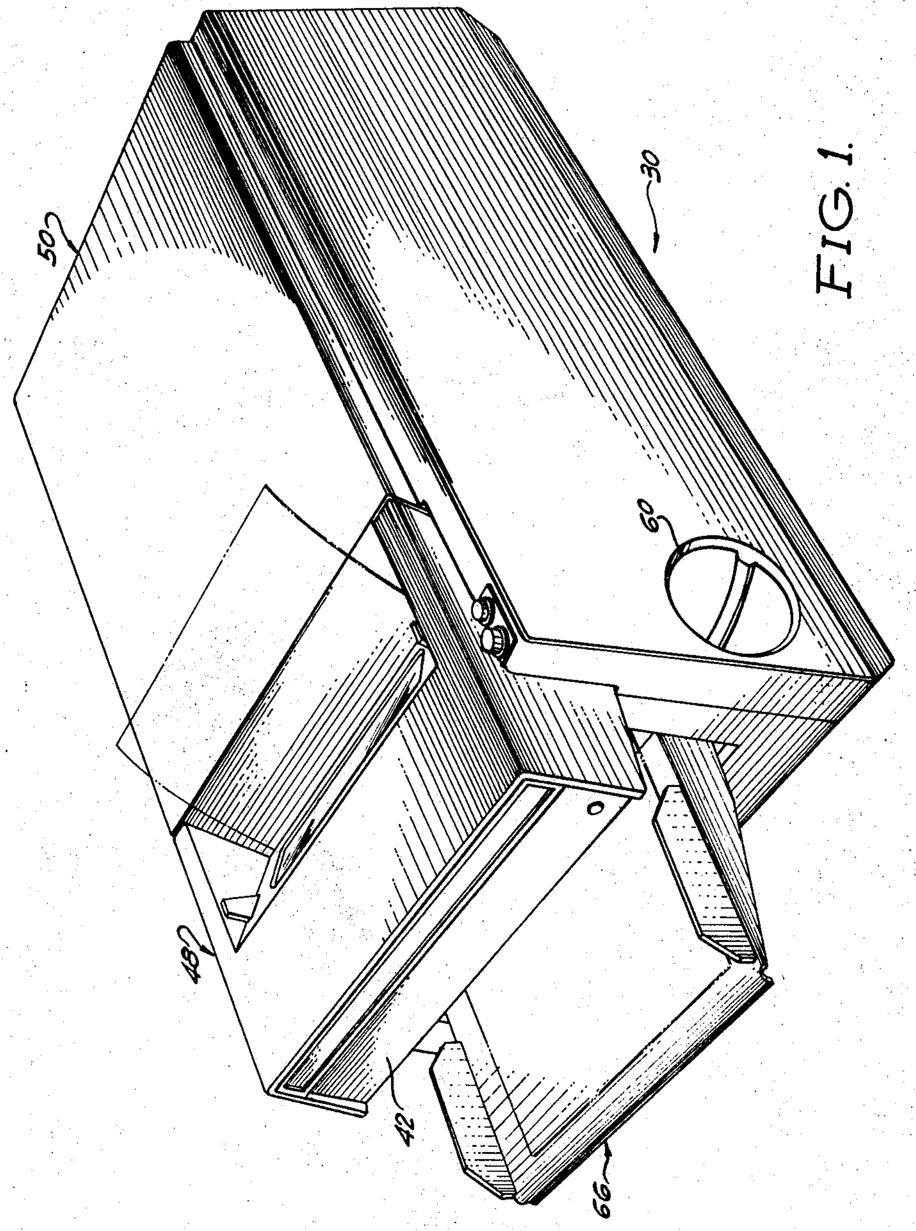
FIG. 1 is a perspective view looking toward the front and right side of a facsimile transceiver incorporating the principles of the present invention.
Figure 2:
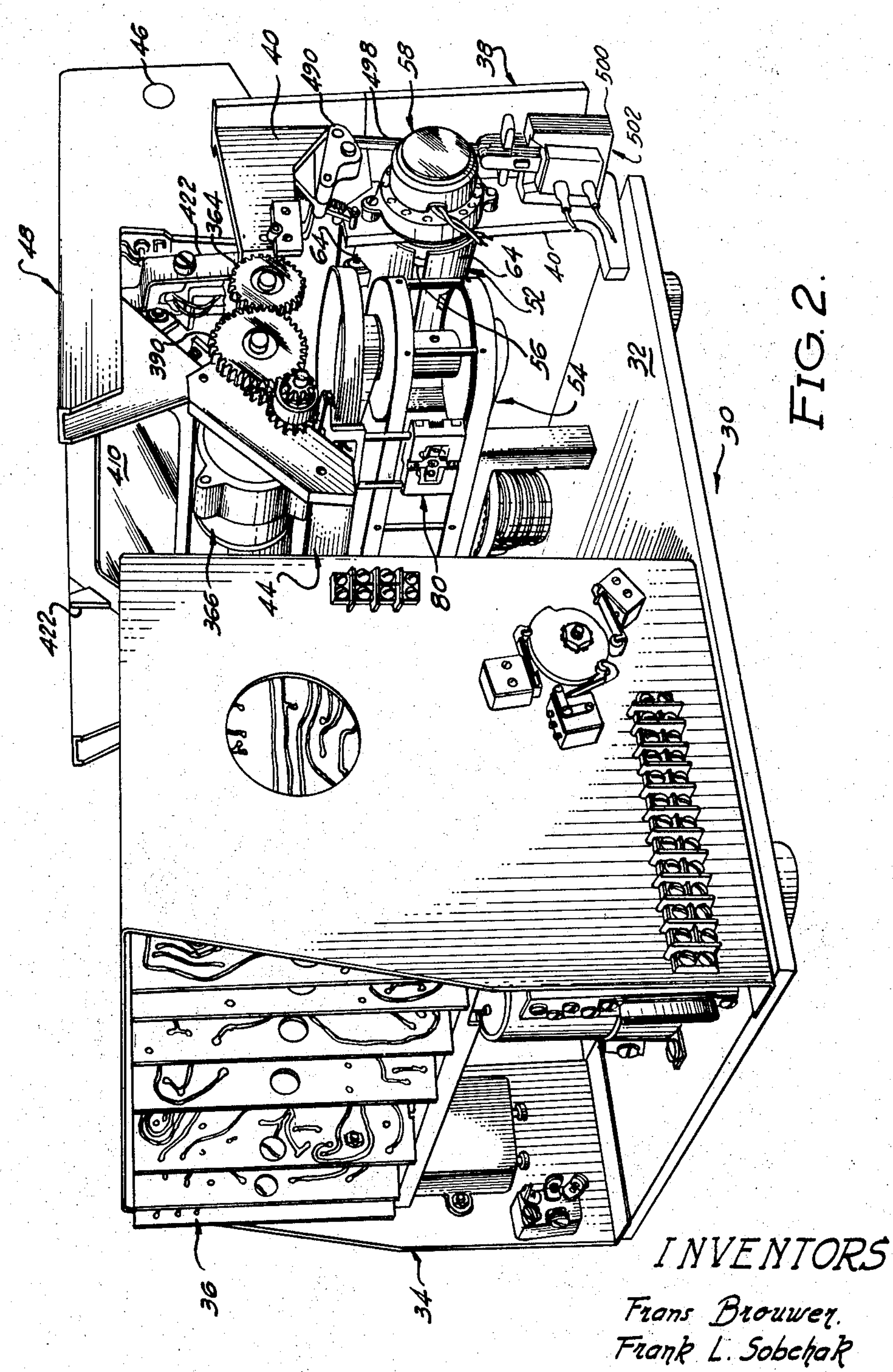
FIG. 2 is a perspective view looking toward the rear and left side of the facsimile transceiver of FIG. 1, with the cover assembly removed.
Figure 3:
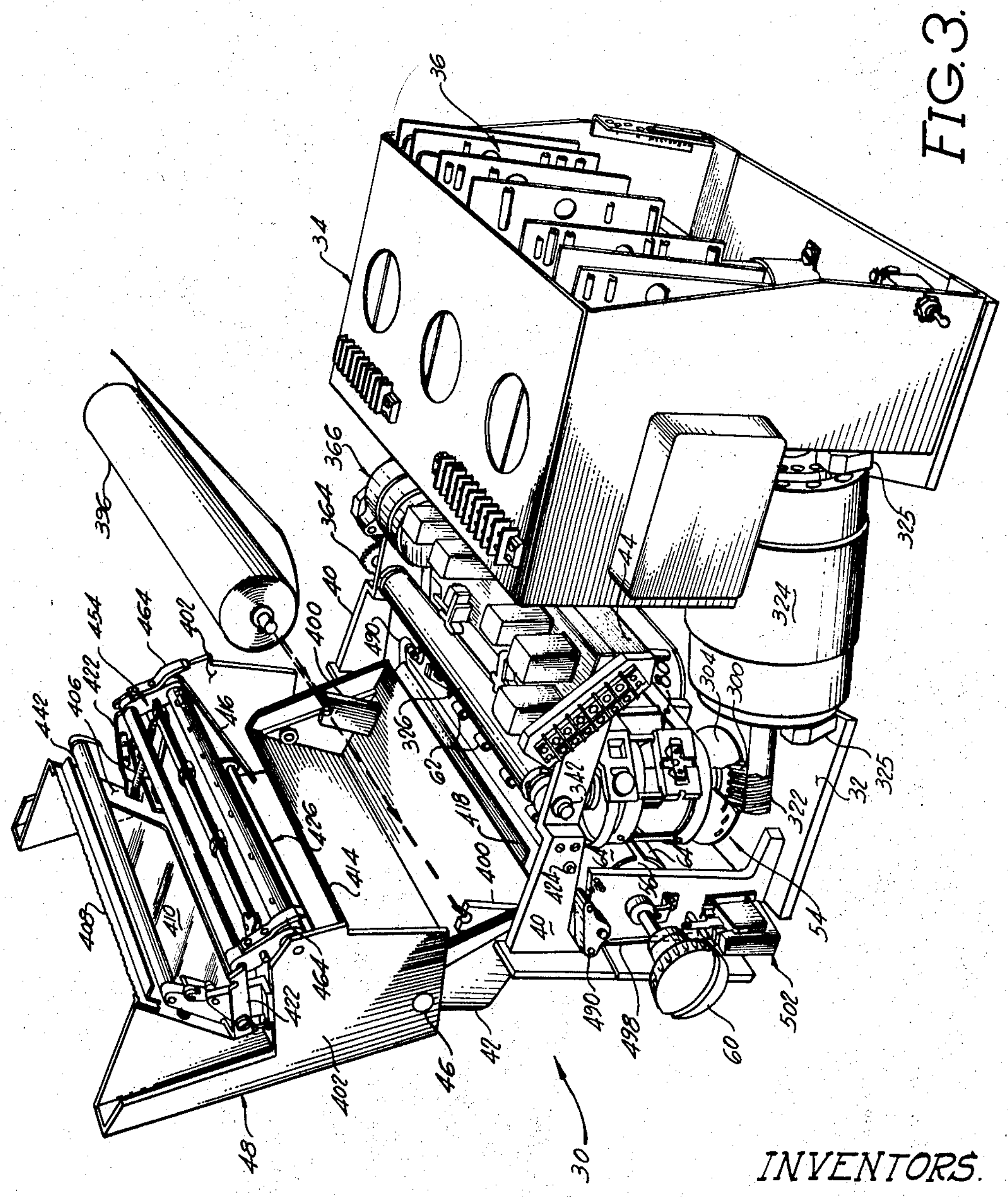
FIG. 3 is a perspective view looking toward the rear and right side of the facsimile transceiver of FIG. 2, with the top door assembly in an open position.
Figure 4:
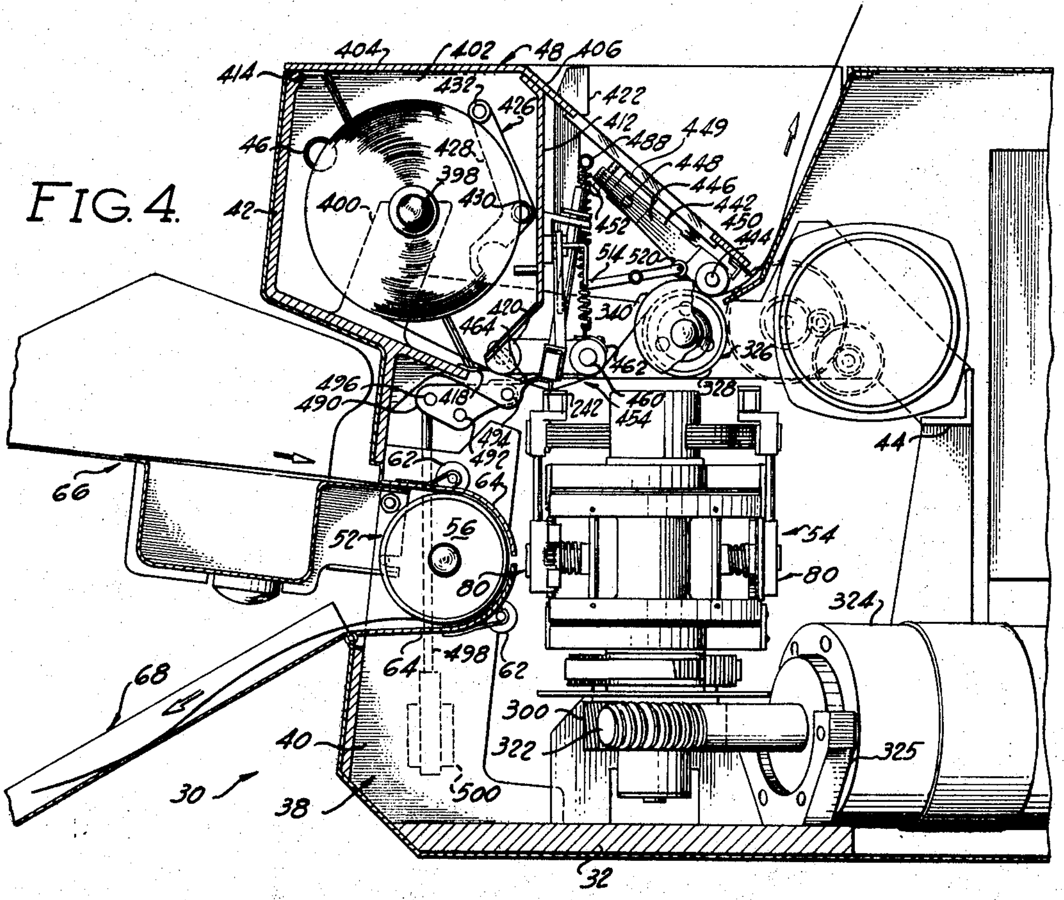
FIG. 4 is an enlarged view, partly in section and partly in elevation, of the front portion of the right side of the facsimile transceiver of FIG. 1.
Figure 19:
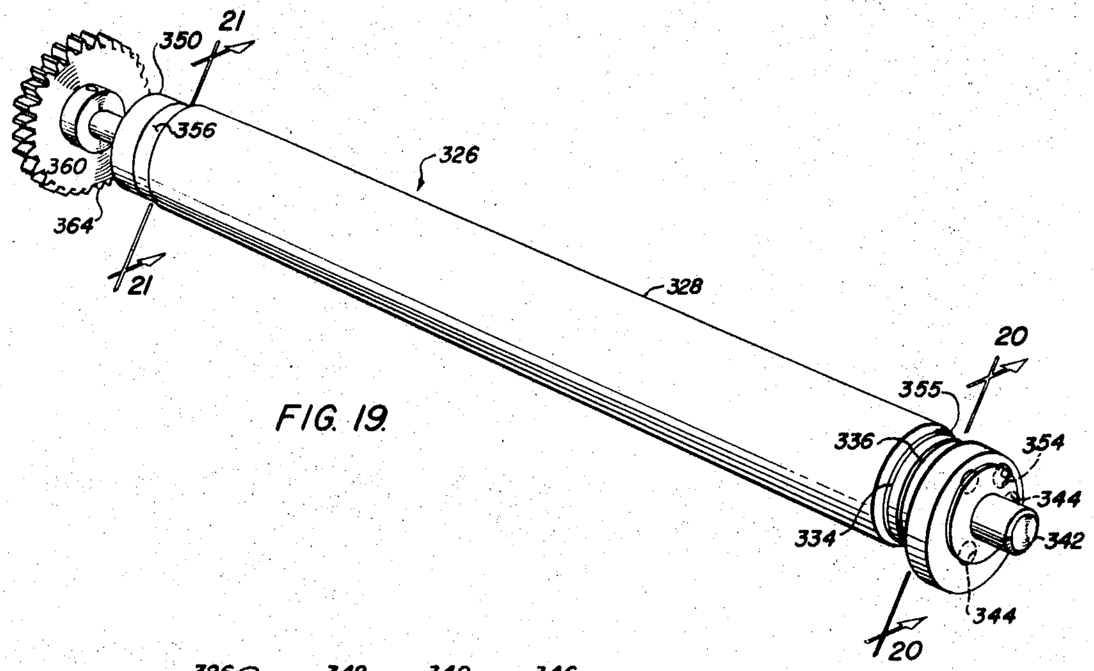
FIG. 19 is a perspective view, on an enlarged scale, looking toward the front of the heat roller assembly of the transceiver of FIGS. 3 and 4.
Figure 20:
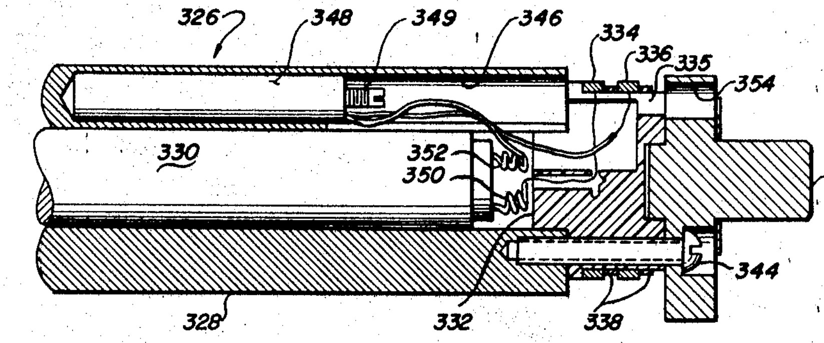
FIG. 20 is a sectional view, on a further enlarged scale, of the right end of the heat roller assembly of FIG. 19, taken substantially along the plane 20—20 in FIG. 19, looking in the direction indicated by the arrows.
Figure 21:
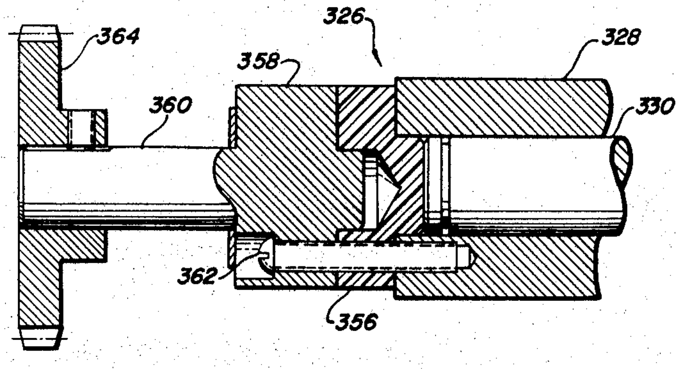
FIG. 21 is a sectional view, on a further enlarged scale, of the left end of the heat roller assembly of FIG. 19, taken substantially along the plane 21—21 in FIG. 19, looking in the direction indicated by the arrows.

As shown in FIGS. 3 and 4, the drive means of the print-out mechanism comprises a combined drive and heat roller assembly 326 which extends transversely of the transceiver base member 32 immediately above the scanner assembly 54 and parallel to the copy feed roller 56. The drive and heat roller assembly 326, as shown in FIGS. 19–21, comprises a tubular heat roller 328 with a cartridge heater 330 disposed lengthwise therein. Mounted at the right end of the tubular heat roller 328 is an insulator block 332 which supports a pair of contact rings 334 and 336 maintained in position by slip ring spacers 338, and a cam or end member 340 that presents an axial stub shaft 342. The cam member 340, the function of which will be described hereinafter, and the insulator block 332 are secured to the tubular heat roller 328 by means of a plurality of screws 344. Arranged in an axial cavity 346 formed in the wall of the tubular heat roller 328 is a thermostat 348 having a temperature adjustment screw 349. One side of the cartridge heater 330 is electrically connected to the contact ring 334 through a conductor 350, the other side of the heater 330 is electrically connected to one side of the thermostat 348 through a conductor 352, and the other side of the thermostat 348 is electrically connected to the contact ring 336 through a conductor 353. The end member 340 and the insulator block 332 are respectively provided with axial passages 354 and 355 that communicate with the cavity 346 to accommodate heat dissipation from and adjustment of the thermostat 348. Mounted at the left end of the tubular heat roller 328 is an insulaor block 356 and an end member 358 that presents an axial stub shaft 360. The end member 358 and the insulator block 356 are secured to the heat roller 328 by means of a plurality of screws 362. Suitably secured to the outer end of the stub shaft 360 is a gear 364. As shown in FIG. 3, the stub shafts 342 and 360 are journalled in the horizontal leg portions of the side frame members 40 of the frame assembly 38.

Figure 22:
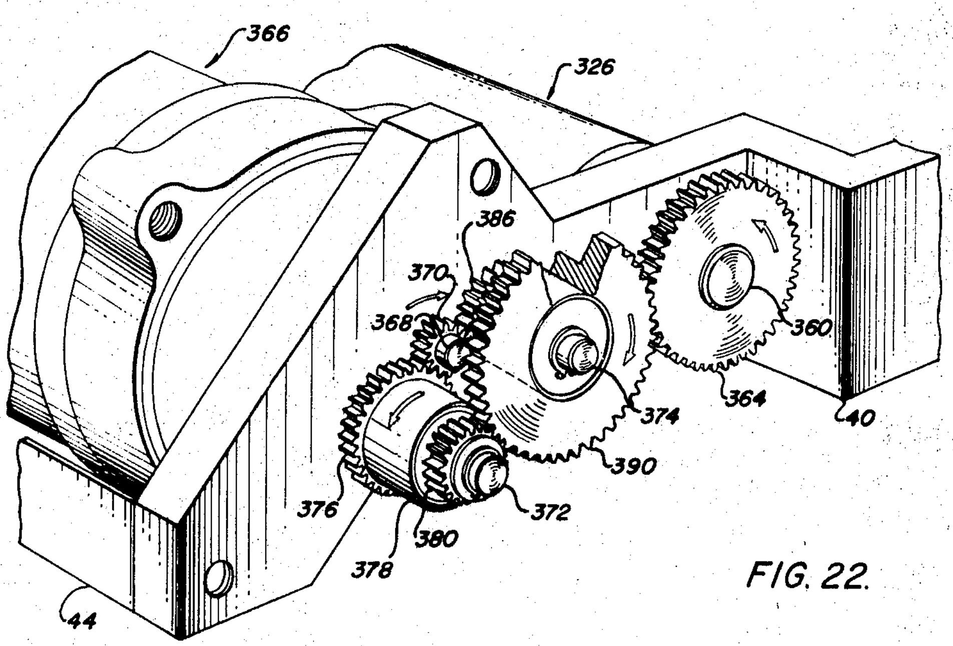
FIG. 22 is a perspective view, on a further enlarged scale, of the drive gear mechanism for the heat roller assembly of FIG. 19.
Figure 23:
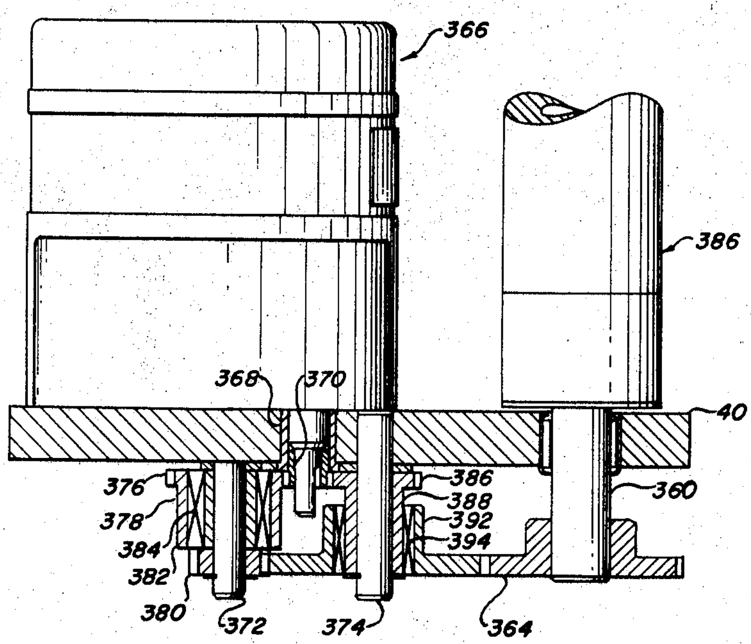
FIG. 23 is a sectional view of the drive gear mechanism of FIG. 22.

In the receiving mode, the drive and heat roller assembly 326 is adapted to be rotated in a counter-clockwise direction, as viewed in FIG. 22, in either one of two speeds. The drive gear mechanism for effecting rotation of the gear 364 of the drive and heat roller assembly 326 comprises a single speed synchronous reversible motor 366 secured to the inboard side of the adjacent side frame member 40. The output shaft 368 of the motor 366 extends beyond the outboard side of the side frame member 40 and, as shown in FIGS. 22 and 23, has secured thereon a drive pinion 370. Secured in the side frame member 40 on opposite sides of the output shaft 368 and parallel thereto are first and second idler shafts 372 and 374. Mounted concentrically of the first idler shaft 372 is a first gear member 376 having a hub portion 378, and journalled on the shaft 372 is a second gear member 380 having a hub portion 382. Interposed between the hub portions 378 and 382 is a first overrunning clutch 384 through which the first gear member 376 is adapted to drive the second gear member 380 only in a counter-clockwise direction. Journalled on the second idler shaft 374 is a third gear member 386 having a hub portion 388, and mounted concentrically about the shaft 374 is a fourth gear member 390 having a hub portion 392. Interposed between the hub portions 388 and 392 is a second overrunning clutch 394 through which the third gear member 386 is adapted to drive the fourth gear member 390 only in a clockwise direction. The drive pinion 370 has constant meshing engagement with the first and third gear members 376 and 386, while the fourth gear member 390 has constant meshing engagement with the second gear member 380 and the heat roller gear 364. When the motor output shaft 368 is rotated in a clockwise direction, low-speed drive is established between the drive pinion 370 and the heat roller gear 364 through the first gear member 376, the first overrunning clutch 384, the second gear member 380 and the fourth gear member 390. When the motor output shaft 368 is rotated in a counter-clockwise direction, high-speed drive is established between the drive pinion 370 and the heat roller gear 364 through the third gear member 386, the second overrunning clutch 394 and the fourth gear member 390. As will be readily appreciated, the selection of the diameters of the several gear members determines the ratio between the two drive speeds.

Rotation of the drive and heat roller assembly 326 serves to withdraw moist electrolytic recording paper, in a manner to be presently described, from a roll 396 (FIGS. 3 and 4). The ends of a spindle 398 disposed through the core of the paper roll 396 are rotatably supported in the upper ends of brackets 400 secured to the shroud 42. The paper roll 396 is adapted to be enclosed by the top door assembly 48 which is comprised of side wall portions 402, a top wall portion 404, an inclined wall portion 406 with a transverse serrated edge 408 and a viewing window 410, and an intermediate depending wall 412. A seal 414 is mounted along the upper edge of the shroud 42, inclined seals 416 are mounted on the inboard faces of the side walls 402, a seal 418 is mounted along the lower edge of the shroud 42, and the flat side of a guide cylinder 420 is secured to the depending wall 412 along the lower edge thereof. When the top door assembly 48 is disposed in the closed position shown in FIG. 4, the seal 414 engages the top wall 404, the seals 416 engage the inclined side edges of the shroud 42, and the seal 418 and the guide cylinder 420 engage the opposite surfaces of the paper being withdrawn from the roll 396. In this manner, the top door assembly 48 and the shroud 42 serve to define a humidor-compartment for the paper roll 396. Thus, the roll of moist recording paper is completely enclosed so that it will retain its necessary moisture content for a long period of time. The top door assembly 48 is adapted to be maintained in closed position by means of a pair of pivotally mounted latch members 422, the lower ends of which are selectively engageable with snap members 424 on the outboard sides of the frame members 40, and the upper ends of which project through the inclined wall 406 for manual operation.

Cooperating with the paper roll 396 is a paper run-out detector assembly 426 (FIGS. 4 and 24). The assembly 426 comprises a pair of arm members 428 which, at their one ends, are pivotally supported as at 430 in the side walls 402 of the top door assembly 48, and, at their other ends, rotatably support a transverse roller 432. The roller 432 is biased into engagement with the outer periphery of the paper roll 396 by means of a torsion spring 434. One of the arm members 428 is provided with a lateral extension 434 that is engageable with the plunger 438 of a switch 440. As paper is withdrawn from the roll 396, the detector assembly 426 pivots about the axes 430, and, when substantially all paper has been withdrawn, the lateral extension 436 engages the plunger 438 to actuate the switch 440 for closing a circuit (not shown) that energizes an alarm buzzer.

Also mounted on the top door assembly 48 for cooperation with the combined drive and heat roller assembly 326 is a pressure roller assembly 442 (FIGS. 4 and 24). The assembly 442 comprises a pressure roller 444 rotatably supported at its ends in arm members 446 pivotally mounted intermediate of their ends, as at 448, to brackets 449 secured to the underside of the inclined wall 406. When the top door assembly 48 is in closed position, springs 450, one associated with each of the arm members 446, serve to bias the pressure roller 444 against the paper in contact with the drive roller 328 whereby to establish a frictional drive of the paper as the drive roller 328 is rotated. To limit pivotal movement of the pressure roller assembly 442 when the top door assembly 48 is opened, stop screws 452 are adjustably threaded through the ends of the arm members 446 opposite the pressure roller 444. The combined drive and heat roller assembly 326 and the pressure roller assembly 442 together comprise drive roller means for the recording paper.

The top door assembly 48, as shown in FIG. 4 and 24, still further provides support for a combined paper tension and printer bar assembly 454 that extends parallel to the copy feed roller 56. The assembly 454 includes arm members 456 pivotally mounted as at 458 to the side walls 402, a transverse tension roller 460 rotatably mounted in the ends of the arm member 456, a parallel generally arcuate brace member 462 extending between the ends of the arm members 456, and tab members 464 secured to the respective arm members 456. Arranged intermediate of the guide cylinder 420 and the tension roller 460 (FIGS. 24 and 25) is a printer bar unit 466 comprised of a support frame 468 having parallel side panels 470 and end stub shafts 472 slidably mounted in the arm members 456. Disposed about the support frame 468 at lengthwise spaced locations therealong are a plurality of clip members 474. Each clip member 474 has an elongated aperture 476 in one side wall thereof, and a lower leg portion 478 underlying the side panels 470. At each clip member 474 to position the same laterally, a pin 480 extends transversely through the side panels 470 and projects into the clip aperture 476. A compression coil spring 482 is also interposed between the pin 480 and the top wall of the clip member 474 whereby the lower leg portion 478 is biased in the direction of the side panels 470. Releasably mounted along the support frame 468 is a generally L-shaped linear printer bar 484 that presents a print-out blade section 486. The body portion of the printer bar 484 seats within shoulders 487 formed along the lower edges of the side panels 470, and is maintained in position by the lower leg portions 478 of the spring loaded clip members 474. The described mounting of the printer bar 484 permits the same to be readily removed and replaced whenever required by conditions of wear of the blade section 486.

When the top door assembly 48 is in closed position as shown in FIG. 4, the printer bar unit 466 is disposed vertically above and in the straight line path of travel of the scanner and printer contact units 80 along one side of the scanner assembly 54. In the transmission mode of the facsimile transceiver 30, the combined paper tension and printer bar assembly 454 is biased upwardly by means of a tension coil spring 488 extending between the inclined wall 406 and the brace member 462 of the assembly 454. In this position of the assembly 454, the lower edge of the print-out blade section 486 is maintained out of engagement with any of the printer contact elements 255 of the printer contact units 80 and the print-out mechanism is rendered inoperative. The assembly 454 is adapted to be pivoted downwardly for disposing the printer bar unit 466 in an operative print-out position by means comprising rocker plates 490 pivotally mounted on the side frame members 40 as at 492. The rocker plates 490, at their one sides, are provided with laterally inwardly extending rollers 494 that are engageable with the respective tab members 464 of the combined paper tension and printer bar assembly 454. The other sides of the rocker plates 490 are pivotally connected as at 496 to the upper ends of rod members 498 extending downwardly to, and having suitable connection with, the plungers 500 of solenoid units 502. In the receiving mode, the solenoid units 502 are energized for drawing the rod members 498 downwardly and thereby pivoting the rocker plates 490 in a counterclockwise direction as viewed in FIG. 4 .During this movement of the rocker plates 490 the rollers 494 urge the tab members 464 upwardly thereby pivoting the combined paper tension and printer bar assembly 454 downwardly whereupon the print-out blade section 486 presses the paper from roll 396 downwardly into contact with the printer contact element 255 of the adjacent printer contact unit 80. Upon termination of the receiving mode, the solenoid units 502 are deenergized, and the spring 488 again pivots the combined paper tension and printer bar assembly 454 upwardly for withdrawing the printer bar unit 466 from an operating print-out position.

To equalize wear along the lower edge of the print-out blade section 486, means are provided for cyclically shifting the printer bar unit 466 lengthwise as the combined drive and heat roller assembly 326 rotates in the receiving mode. Such means comprises, as shown in FIG. 24, a projection 504 which, at one end is secured to the printer bar support frame 468 and, at the other end, engages one side of a rocker plate 506 pivotally mounted as at 508 to a bracket 510 carried by the top door assembly 48. The other side of the rocker plate 506 is interconnected by a link 512 to one end of a rocking lever 514 pivotally mounted as at 516 on a bracket 518 carried by the top door assembly 48. The other end of the rocking lever 514 is provided with a roller follower 520 which, when the top door assembly 48 is closed as shown in FIG. 4, engages the periphery of the cam member 340 of the combined drive and heat roller assembly 326. As the cam member 340 rotates in the receiving mode, the rocking lever 514 is pivoted about the axis 516, the rocker plate 506 is pivoted about the axis 508 by reason of the interconnecting link 512, and the projection 504 together with the printer bar unit 466 is accordingly shifted lengthwise to the right as viewed in FIG. 24. To shift the printer bar unit 466 back to the left, and to maintain the roller follower 520 in continuous engagement with the cam member 340, a tension coil return-spring 522 is mounted between the brace member 462 of the assembly 454 and a guide rod 524. The combined action of the rotating cam member 340 and the return-spring 522 causes the printer bar unit 466 to move back and forth for each revolution of the combined drive and heat roller assembly 326. As shown in FIGS. 24–26, one end of the guide rod 524 is secured to the printer bar support frame 468, while the other end thereof extends through and is slidably received in an elongated opening 526 provided in a guide bracket 528 carried by the top door assembly 48. The guide rod 524 not only provides a connection point for one end of the spring 522 but also serves to maintain the print-out blade section 486 perpendicular to the printer contact elements 255 during shifting movement of the printer bar unit 466 in the receiving mode.

With the top door assembly 48 closed as shown in FIG. 4, recording paper 397 from the roll 396 extends between the seal 418 and the guide cylinder 420, across the bottom edge of the printer blade 466, about the tension roller 460, and between the heat roller 328 and the pressure roller 444. During initial startup in the receiving mode, the drive and heat roller assembly 326 is driven at high speed for rapidly clearing the print-out area of dry paper in accordance with the teachings in U.S. Pat No. 3,240,871, issued Mar. 15, 1966. Thereafter, while data is being reproduced, the assembly 326 is driven in low or normal speed. A change in drive speed may be conveniently effected by merely changing the direction of current flow through the motor 366, a suitable switch (not shown) being provided for this operation. For purposes of the present invention, a ratio between high and low speed of 5 to 1 has been found satisfactory. Also, in the receiving mode, the solenoid units 502 are energized for pivoting the combined paper tension and printer bar assembly 454 downwardly whereupon the printer blade section 486 is urged against the adjacent printer contact elements 255 with the recording paper disposed therebetween. As the timing belt assembly 78 is rotated, the printer contact units 80 are moved in the aforementioned continuous closed path and the printer contact elements 255 are successively moved lengthwise of the printer blade section 486. Printing current is passed through the associated printer contact elements 255, the recording paper and the printer blade section 486, and iron from the printer blade 486 is deposited on the recording paper and reacts with chemicals therein to produce an image of the transmitted copy. In this manner, copy is reproduced, line-by-line, an elemental area at a time, in synchronism with another transceiver or suitable transmitter in which copy material is being scanned. As the recording paper passes over the combined drive and heat roller assembly 326, it is dried and the electrolytic printing process is completed. By combining the drive means and the heat means for the recording paper in a single assembly 326, and arranging the same closely adjacent to the combined paper tension and printer bar assembly 454, the distance between the print-out area and the point of issuance of paper with reproduced data is minimized, and the time between print-out and presentation of reproduced data for viewing is accordingly reduced. As recording paper is issued along the lower edge of the inclined wall portion 406, reproduced copy may be viewed immediately, and the printed paper may be removed at any time by tearing it along the serrated edge 408.

Upon completion of print-out and de-energization of the solenoid units 502, spring 488 pivots the assembly 454 upwardly whereby the printer bar unit 466 is withdrawn or moved to an inoperative position away from the printer contact elements 255. This arrangement then permits transmission of data without concurrent print-out of such data in the same machine. Referring to FIG. 4, the copy feed roller 56 is adapted to draw copy material, with the graphic data to be scanned facing up, onto its top side and discharge the same on its underside, and the drive roller assembly 326 is adapted to draw recording paper from the roll 396 between the printer contact elements 255 and the printer bar blade 486 in the same direction as copy material is adapted to be drawn onto the copy feed roller. By reason of this relationship, reproduced data on recording paper issuing from one transceiver is oriented in the same manner as original scanned data on copy material presented to another transceiver. Finally, by providing a combined facsimile transmitter and receiver, economies of manufacture result and machine space requirements are minimized. In this connection, the combined scanner and printer contact units contribute to compactness because movement of the optical scanners as required in the transmission mode and movement of the printer contact means as required in the receiving mode are effected by a single drive system.

While there has been disclosed a preferred embodiment of the present invention, it will be understood by those skilled in the art that various rearrangements and modifications may be made therein without departing from the spirit and scope of the invention.

We claim:

1. In a facsimile transceiver, the combination of a rotatable copy feed roller, at least one combined scanner and printer contact unit comprising an optical scanner for scanning copy material on said copy feed roller and printer contact means, means for repeatedly moving said combined scanner and printer contact unit in a path at least a portion of which extends parallel to said copy feed roller, a printer bar assembly extending parallel to said copy feed roller for cooperation with said printer contact means and means separate from said copy feed roller for moving recording paper between said printer contact means and said printer bar assembly.

2. The combination of claim 1 wherein said means for moving said combined scanner and printer contact unit comprises frame means a drive pulley assembly rotatably mounted in said frame means, means for rotating said drive pulley assembly, an idler pulley assembly rotatably mounted in said frame means, a timing belt assembly trained about said drive and idler pulley assemblies with one side thereof extending parallel to said copy feed roller, and means mounting said combined scanner and printer contact unit on said timing belt assembly for movement therewith in a continuous closed path upon rotation of said drive pulley assembly.

3. The combination of claim 2 including a plurality of combined scanner and printer contact units, and means individually mounting said combined scanner and printer contact units on said timing belt assembly; and wherein each of said combined scanner and printer contact units comprises an optical scanner carriage assembly, said optical scanner secured in said optical scanner carriage assembly, said optical scanner including a horizontal elongated hollow lens holder with the forward end thereof facing outwardly of said timing belt assembly and the rearward end thereof facing inwardly of said timing belt assembly, a lens mounted in said forward end of said lens holder, a photocell mounted at said rearward end of said lens holder, diaphragm means positioned transversely of said lens holder forwardly of said photocell and defining an aperture, said diaphragm means being adjustably movable for varying the position of said aperture relative to the centerline of said lens holder, a carriage block supported on said optical scanner carriage assembly vertically thereabove, a printer contact strip extending along and secured at one end to said carriage block, and said printer contact strip at the other end having a printer contact element which is movable in the general vertical plane of the centerline of said optical scanner and which is arranged for cooperation with said printer bar assembly.

4. The combination of claim 3 including light source means carried by each of said optical scanner carriage assemblies at the forward ends of said lens holders.

5. The combination of claim 4 wherein said timing belt assembly is comprised of spaced apart endless flexible tapes of narrow width, a plurality of pin members extending between and secured at their end portions to said tapes, said pin members being of the same overall length equi-distantly spaced apart in parallel relation, and each set of corresponding end portions of said pin members being secured to the adjacent one of said tapes in a common plane; wherein said drive pulley assembly is provided with cylindrical faces engageable with said tapes, radial shoulders engageable with the ends of said pin members, and tooth recesses for sequentially receiving said pin members and thereby establishing a positive drive connection between said drive pulley assembly and said timing belt assembly; and wherein said idler pulley assembly is provided with cylindrical faces engageable with said tapes, and radial shoulders engageable with the ends of said pin members in the same planes as said radial shoulders of said drive pulley assembly whereby said pin members are maintained in vertical alignment.

6. The combination of claim 5 wherein each of said optical scanner units is mounted on two of said pin members, and said mounting means locates said optical scanner unit positively axially on one of said two pin members and loosely on the other of said two pin members.

7. The combination of claim 6 including means normally biasing said printer bar assembly away from operative relation with said printer contact means, and solenoid operated means for moving said printer bar assembly into operative relation with said printer contact means.

8. The combination of claim 7 wherein said means for moving recording paper comprises a combined drive and heat roller assembly adjacent and parallel to said printer bar assembly, a pressure roller disposed to contact said roller assembly to frictionally engage recording paper therebetween, and means for rotating said roller assembly.

9. The combination of claim 8 wherein said means for rotating said roller assembly comprises a single-speed reversible motor having an output shaft, and drive gear means between said output shaft and said roller assembly for driving the latter at one speed in one direction upon rotation of said motor in one direction and at a different speed in said one direction upon rotation of said motor in the other direction.

10. The combination of claim 1 wherein said means for moving recording paper comprises a combined drive and heat roller assembly, a pressure roller disposed to contact said roller assembly to frictionally engage recording paper therebetween, and means for rotating said roller assembly.

11. The combination of claim 3 including a plurality of electrical connectors secured in said carriage block with said electrical connectors being connected by electrical conductors to said optical scanner and said printer contact strip, a preamplifier assembly rotatably mounted in said frame means about a vertical axis, means establishing a driving connection between said drive pulley assembly and said preamplifier assembly whereby the latter is rotated in the same direction and at the same speed in r.p.m. as said timing belt assembly, multiple-conductor flexible ribbon tape means electrically interconnecting said electrical conductors of each of said optical scanner units with said preamplifier assembly, and means for electrically interconnecting said preamplifier assembly with other electrical components.

12. The combination of claim 11 wherein said ribbon tape means is comprised of a single ribbon tape electrically interconnected among said optical scanner units and said preamplifier assembly.

13. The combination of claim 1 wherein said copy feed roller is adapted to draw copy material onto its top side and discharge the same on its underside, and said means for moving recording paper is adapted to move recording paper between said printer contact means and said printer bar assembly in the same direction as copy material is adapted to be drawn onto said copy feed roller.

14. The combination of claim 13 wherein said means for moving said combined scanner and printer contact unit comprises frame means, a drive pulley assembly rotatably mounted in said frame means, means for rotating said drive pulley assembly, an idler pulley assembly rotatably mounted in said frame means, a timing belt assembly trained about said drive and idler pulley assemblies with one side thereof extending parallel to said copy feed roller, and means mounting said combined scanner and printer contact unit on said timing belt assembly for movement therewith in a continuous closed path upon rotation of said drive pulley assembly.

15. The combination of claim 13 wherein said means for moving recording paper comprises a drive roller extending parallel to said copy feed roller, a pressure roller disposed to contact said drive roller to frictionally engage recording paper therebetween, and means for rotating said drive roller.

16. The combination of claim 13 including a roll of recording paper extending parallel to said copy feed roller on the same side of said printer bar assembly; and wherein said means for moving recording paper is arranged on the opposite side of said printer bar assembly as said copy feed roller and comprises a drive roller extending parallel to said copy feed roller, a pressure roller disposed to contact said drive roller to frictionally engage recording paper therebetween, and means for rotating said drive roller for drawing recording paper from said roll between said printer contact means and said printer bar assembly in the same direction as copy material is adapted to be drawn onto said copy feed roller.

17. The combination of claim 1 wherein said combined scanner and printer contact unit comprises an optical scanner carriage assembly, said optical scanner secured in said optical scanner carriage assembly, and means mounting said printer contact means on said optical scanner carriage assembly.

18. The combination of claim 17 wherein the centerline of said optical scanner is disposed horizontally, said mounting means for said printer contact means includes a carriage block supported on said optical carriage assembly vertically thereabove, said printer contact means includes a printer contact strip extending along and secured at one end to said carriage block, and said printer contact strip at the other end having a printer contact element that is movable in the general vertical plane of the centerline of said optical scanner.

19. The optical scanner assembly of claim 17 including a rotor assembly rotatably mounted in said frame means, means establishing a driving connection between said drive pulley assembly and said rotor assembly whereby the latter is rotated in the same direction and at the same speed in r.p.m. as said timing belt assembly, means for electrically interconnecting said optical scanner unit with said rotor assembly, and means for electrically interconnecting said rotor assembly with other electrical components.

20. The combination of claim 2, including a plurality of combined optical scanner and printer contact units each including an optical scanner carriage assembly securing one of said optical scanners, and means individually mounting said optical scanner carriage assemblies on said timing belt assembly for movement therewith in a continuous closed path upon rotation of said drive pulley assembly.

21. The combination of claim 20 including means on said frame means for selectively locking said drive pulley assembly against rotation whereby said optical scanner units may be individually indexed at a common location and said diaphragm means of each of said optical scanners adjusted for accurately aligning said optical scanners in corresponding horizontal and vertical planes.

22. The optical scanner assembly of claim 20 wherein each of said optical scanner units includes a carriage block supported on said optical scanner assembly vertically thereabove, a printer contact strip extending along and secured at one end to said carriage block, and said printer contact strip at the other end having a printer contact element that is movable in the general vertical plane of the centerline of said optical scanner.

23. The optical scanner assembly of claim 20 wherein the effective driven circumference of said timing belt assembly is a whole number multiple of the effective driving circumference of said drive pulley assembly.

24. The combination of claim 23 including a synchronizer disc mounted for direct rotation with said drive pulley assembly, and wherein the number of said optical scanner units is equal to said whole number multiple.

25. The combination of claim 2 wherein said optical scanner comprises a horizontal elongated hollow lens holder with the forward end thereof facing outwardly of said timing belt assembly and the rearward end thereof facing inwardly of said timing belt assembly, a double convex lens mounted in said forward end of said lens holder, a photocell mounted at said rearward end of said lens holder, diaphragm means positioned transversely of said lens holder forwardly of said photocell and defining an aperture, and said diaphragm means being adjustably movable for varying the position of said aperture relative to the centerline of said lens holder so that said photocell may receive the projected image of any one of a plurality of object areas at different positions relative to the centerline of said lens holder.

26. The combination of claim 25 including light source means carried by said optical scanner carriage assembly at the forward end of said lens holder.

27. The combination of claim 2 wherein said timing belt assembly is comprised of spaced apart endless flexible tapes of narrow width, a plurality of pin members extending between and secured at their end portions to said tapes, said pin members being of the same overall length equi-distantly spaced apart in parallel relation, and each set of corresponding end portions of said pin members being secured to the adjacent one of said tapes in a common plane; wherein said drive pulley assembly is provided with cylindrical faces engageable with said tapes, radial shoulders engageable with the ends of said pin members, and tooth recesses for sequentially receiving said pin members and thereby establishing a positive driving connection between said drive pulley assembly and said timing belt assembly; and wherein said idler pulley assembly is provided with cylindrical faces engageable with said tapes, and radial shoulders engageable with the ends of said pin members in the same planes as said radial shoulders of said drive pulley assembly whereby said pin members are maintained in vertical alignment.

28. The combination of claim 27 wherein said optical scanner unit comprises an optical scanner carriage assembly, and an optical scanner secured in said optical scanner carriage assembly; and wherein said mounting means comprises spring biased latch means for connecting said optical scanner carriage assembly on two of said pin members, and cooperating spring biased means for positively locating said optical scanner carriage assembly axially of one of said two pin members.

29. The combination of claim 27 wherein said frame means on at least one side intermediate of said drive and idler pulley assemblies is formed with longitudinal guide surfaces, and including longitudinal spring biased guide strips mounted on said frame means and engageable with said tapes for biasing the same against said guide surfaces to maintain said tapes in a straight path intermediate of said drive and idler pulley assemblies.

30. The combination of claim 2 wherein said timing belt assembly is comprised of a pair of spaced apart endless flexible tapes of narrow width, and a plurality of pin members extending between and secured at their end portions to said tapes; and wherein said drive pulley assembly includes tooth recesses for sequentially receiving said pin members and thereby establishing a positive driving connection between said drive pulley assembly and said timing belt assembly.

31. The combination of claim 30 including guide means on said frame means for maintaining said tapes in a straight path intermediate of said drive and idler pulley assemblies.

32. The combination of claim 30 wherein said optical scanner unit is mounted on two of said pin members, and said mounting means locates said optical scanner unit positively axially on one of said two pin members and loosely on the other of said two pin members.

33. The combination of claim 2 wherein said timing belt assembly includes endless flexible tape means with a plurality of tooth elements disposed therealong, and said drive pulley assembly includes tooth recesses for sequentially receiving said tooth elements and thereby establishing a positive driving connection between said drive pulley assembly and said timing belt assembly.

34. In a facsimile transceiver having a transmission mode and a receiving mode, the combination of at least one combined scanner and printer contact unit comprising an optical scanner operative in the transmission mode to scan copy material and printer contact means mounted thereabove, means for moving said combined scanner and printer contact unit in a path at least a portion of which extends in a horizontal straight line, a printer bar unit extending parallel to said straight line portion of said path of said combined scanner and printer contact unit, means for moving said printer bar unit away from operative relation with said printer contact means in the transmission mode, and means for moving said printer bar unit into operative relation with said printer contact means in the receiving mode.

35. The combination of claim 34 wherein said means for moving said combined scanner and printer contact unit comprises frame means, a drive pulley assembly rotatably mounted in said frame means, means for rotating said drive pulley assembly, an idler pulley assembly rotatably mounted in said frame means, a timing belt assembly trained about said drive and idler pulley assemblies, and means mounting said combined scanner and printer contact unit on said timing belt assembly for movement therewith in a continuous closed path upon rotation of said drive pulley assembly.

36. The combination of claim 34 wherein the ends of said printer bar unit are supported in pivotally mounted arm members, spring means normally pivot said arm members upwardly to withdraw said printer bar unit away from operative relation with said printer contact means in the transmission mode, and solenoid operated linkage means pivots said arm members downwardly to move said printer bar unit into operative relation with said printer contact means in the receiving mode.

37. The combination of claim 36 including a roll of recording paper extending parallel to said printer bar unit, a drive roller extending parallel to said printer bar unit, a pressure roller disposed to contact said driver roller to frictionally engage recording paper therebetween, means for rotating said drive roller for drawing recording paper from said roll between said printer contact means and said printer bar unit, and a tension roller rotatably mounted in said pivotally mounted arm members and being engageable with said recording paper.

38. The combination of claim 37 wherein said ends of said printer bar unit are slidably supported in said pivotally mounted arm members, and including means between said drive roller and said printer bar unit for effecting cyclical shifting of the printer bar unit lengthwise as the drive roller rotates in the receiving mode.

39. The combination of claim 38 including a guide bracket having a horizontal elongated opening therein, and a guide rod at one end secured to said printer bar unit and at the other end being slidably received in said elongated opening for maintaining said printer bar unit in operative alignment with said printer contact means during shifting movement of the printer bar unit in the receiving mode.

40. For use in a facsimile transceiver, a combined scanner and printer contact unit comprising an optical scanner carriage assembly, an optical scanner secured to said optical scanner carriage assembly and having its centerline horizontally disposed, a carriage block supported on said optical carriage assembly vertically thereabove, a printer contact strip extending along and secured at one end of said carriage block, and a printer contact element at the other end of said printer contact strip, said printer contact strip being movable in the general vertical plane of the centerline of said optical scanner.

41. The combined scanner and printer contact unit of claim 40 wherein said optical scanner is comprised of an elongated hollow lens holder, a lens mounted in the forward end of said lens holder, a photocell mounted at the rearward end of said lens holder, diaphragm means positioned transversely of said lens holder forwardly of said photocell and defining an aperture, and light source means supported by said optical scanner carriage assembly.

42. The combined scanner and printer contact unit of claim 41 including a plurality of electrical connectors secured in said carriage block, said electrical connectors being connected by electrical conductors to said light source means and said photocell and said printer contact strip, and said electrical connectors being adapted to be connected individually to lengthwise conductors provided on a flexible ribbon tape.

References Cited

UNITED STATES PATENTS

| | | | |
|---|---|---|---|
| 3,060,262 | 10/1962 | Hoer | 178—7.1 |
| 3,190,956 | 6/1965 | Vaccaro | 178—6.6 |
| 3,432,613 | 3/1969 | Saeger et al. | 178—6.6 X |

RICHARD MURRAY, Primary Examiner

R. K. ECKERT, JR., Assistant Examiner

U.S. Cl. X.R.

74—216.5; 178—6, 7.6; 192—.092; 219—471